(12) United States Patent
Churchill

(10) Patent No.: US 10,088,064 B2
(45) Date of Patent: Oct. 2, 2018

(54) DRILL STRING CHECK VALVE

(71) Applicant: Churchill Drilling Tools Limited, Aberdeen (GB)

(72) Inventor: Andrew Churchill, Aberdeen (GB)

(73) Assignee: Churchill Drilling Tools Limited, Cove, Aberdeen (GB)

(*) Notice: Subject to any disclaimer, the term of this patent is extended or adjusted under 35 U.S.C. 154(b) by 392 days.

(21) Appl. No.: 14/361,235

(22) PCT Filed: Nov. 27, 2012

(86) PCT No.: PCT/GB2012/052924
§ 371 (c)(1),
(2) Date: May 28, 2014

(87) PCT Pub. No.: WO2013/079926
PCT Pub. Date: Jun. 6, 2013

(65) Prior Publication Data
US 2014/0332277 A1 Nov. 13, 2014

(30) Foreign Application Priority Data
Nov. 28, 2011 (GB) .................................. 1120487.2
Mar. 8, 2012 (GB) .................................. 1204082.0

(51) Int. Cl.
*F16K 15/00* (2006.01)
*E21B 21/10* (2006.01)
(Continued)

(52) U.S. Cl.
CPC .............. *F16K 15/00* (2013.01); *E21B 21/08* (2013.01); *E21B 21/10* (2013.01); *E21B 21/103* (2013.01); *E21B 34/00* (2013.01); *E21B 34/06* (2013.01)

(58) Field of Classification Search
CPC ........ E21B 21/08; E21B 21/10; E21B 21/103; E21B 34/06; E21B 34/10; E21B 34/103; E21B 34/14
See application file for complete search history.

(56) References Cited

U.S. PATENT DOCUMENTS 3,292,707 A * 12/1966 Nelson .................... E21B 21/10
137/493.9
3,385,370 A 5/1968 Knox et al.
(Continued)

FOREIGN PATENT DOCUMENTS

GB 2244505 A 12/1991
GB 2362664 A 11/2001
(Continued)

OTHER PUBLICATIONS

U.K. Intellectual Property Office's Search Report dated Mar. 7, 2012 for Application No. GB1120487.2.
(Continued)

*Primary Examiner* — Jennifer H Gay
(74) *Attorney, Agent, or Firm* — Dinsmore & Shohl LLP

(57) ABSTRACT

A drilling method comprising running a drill string (12) part way into a bore (11); then pumping fluid through the drill string; then running the drill string further into the bore; and then reconfiguring a check valve (20) located towards the distal end of the drill string from a running configuration, in which the valve permits flow both up and down the string, to a drilling configuration in which the valve permits flow down through the string but prevents flow up through the string.

27 Claims, 24 Drawing Sheets

(51) Int. Cl.
*E21B 34/06* (2006.01)
*E21B 21/08* (2006.01)
*E21B 34/00* (2006.01)

(56) References Cited

U.S. PATENT DOCUMENTS

| | | | |
|---|---|---|---|
| 3,606,924 A * | 9/1971 | Malone | E21B 21/00 166/187 |
| 3,783,942 A * | 1/1974 | Mott | E21B 21/10 166/323 |
| 3,835,925 A * | 9/1974 | Mott | E21B 21/10 166/323 |
| 3,850,194 A * | 11/1974 | Brown | E21B 21/10 137/496 |
| 3,901,333 A | 8/1975 | Mori | |
| 3,907,046 A * | 9/1975 | Gaylord | E21B 34/14 175/235 |
| 3,908,769 A | 9/1975 | Schuyf et al. | |
| 3,938,589 A * | 2/1976 | Mott | E21B 21/10 166/325 |
| 4,108,203 A | 8/1978 | Brown | |
| 4,134,455 A | 1/1979 | Read | |
| 4,270,569 A * | 6/1981 | Reay | E21B 21/10 137/514.7 |
| 4,291,722 A * | 9/1981 | Churchman | E21B 21/10 137/496 |
| 4,378,818 A * | 4/1983 | Cormier, Jr. | E21B 21/10 137/463 |
| 4,391,328 A * | 7/1983 | Aumann | E21B 34/08 166/321 |
| 4,622,993 A * | 11/1986 | Taylor | E21B 21/10 137/542 |
| 4,699,216 A | 10/1987 | Rankin | |
| 4,729,432 A | 3/1988 | Helms | |
| 4,983,803 A | 1/1991 | Pringle et al. | |
| 5,320,181 A * | 6/1994 | Lantier, Sr. | E21B 21/10 166/325 |
| 6,343,650 B1 * | 2/2002 | Ringgenberg | E21B 33/128 166/124 |
| 6,401,822 B1 * | 6/2002 | Baugh | E21B 21/10 166/154 |
| 8,353,353 B2 | 1/2013 | Reaux | E21B 34/066 166/331 |
| 9,347,286 B2 * | 5/2016 | Swietlik | E21B 21/10 |
| 2002/0033262 A1 * | 3/2002 | Musselwhite | E21B 17/14 166/285 |
| 2002/0148614 A1 | 10/2002 | Szarka et al. | |
| 2003/0047314 A1 * | 3/2003 | Allamon | E21B 21/10 166/332.8 |
| 2003/0209350 A1 | 11/2003 | Laurel | |
| 2003/0217843 A1 | 11/2003 | Mullins | |
| 2005/0236154 A1 | 10/2005 | Tudor et al. | |
| 2006/0011354 A1 * | 1/2006 | Logiudice | E21B 21/103 166/380 |
| 2007/0215356 A1 * | 9/2007 | Leeb | E21B 21/10 166/325 |
| 2011/0088908 A1 | 4/2011 | Xu | |
| 2011/0139506 A1 * | 6/2011 | Lovorn | E21B 21/08 175/25 |
| 2011/0290344 A1 * | 12/2011 | Groesbeck | E21B 21/10 137/430 |
| 2012/0006553 A1 | 1/2012 | Korkmaz | |
| 2012/0228027 A1 * | 9/2012 | Sehsah | E21B 21/08 175/48 |
| 2013/0062122 A1 * | 3/2013 | Lovorn | E21B 33/085 175/24 |
| 2013/0112404 A1 * | 5/2013 | Lovorn | E21B 33/085 166/250.01 |
| 2013/0118752 A1 * | 5/2013 | Hannegan | E21B 47/0005 166/336 |
| 2013/0133948 A1 * | 5/2013 | Lovorn | E21B 21/08 175/24 |
| 2014/0332277 A1 * | 11/2014 | Churchill | E21B 21/103 175/57 |
| 2015/0136404 A1 * | 5/2015 | Groesbeck | E21B 21/10 166/318 |
| 2015/0240596 A1 * | 8/2015 | Horwell | E21B 34/12 166/332.8 |
| 2016/0032669 A1 * | 2/2016 | Churchill | E21B 34/14 175/40 |

FOREIGN PATENT DOCUMENTS

| | | |
|---|---|---|
| GB | 2364341 A | 1/2002 |
| WO | 2008005289 A2 | 1/2008 |
| WO | 2010128287 A2 | 11/2010 |
| WO | 2011149904 A1 | 12/2011 |

OTHER PUBLICATIONS

International Search Report dated Jan. 9, 2014, for PCT/GB2012/052924.
Written Opinion of the International Searching Authority for PCT/GB2012/052924.

* cited by examiner

DRILL STRING CHECK VALVE

CROSS-REFERENCE TO RELATED APPLICATIONS

This application is the U.S. National Phase of PCT/GB2012/052924 filed Nov. 27, 2012, which claims priority of Great Britain Patent Application 1120487.2 filed Nov. 28, 2011, and Great Britain Patent Application 1204082.0 filed Mar. 8, 2012.

FIELD OF THE INVENTION

This invention relates to a check valve for a drilling string, which check valve may be incorporated in a drilling bottom hole assembly (BHA). The invention also relates to drilling methods utilising a check valve.

BACKGROUND OF THE INVENTION

In the oil and gas industry, sub-surface hydrocarbon-bearing formations are accessed by drilling from surface using a drill bit mounted on the end of a drill string. The drill string typically comprises a bottom hole assembly (BHA) which may incorporate the drill bit, heavy walled drill collars, measurement while drilling (MWD) tools, logging while drilling (LWD) tools and rotary steerable drilling systems (RSDS) tools. The BHA will be connected to a large number of relatively small diameter drill pipe sections which extend to surface.

Drilling BHAs will sometimes include check or float valves which allow drilling fluid to be pumped downhole through the drill string to the drill bit, but which prevent fluid from flowing into the drill string and up the string to surface. Indeed, some operators now insist that two independent check valves are provided in every drilling BHA, particularly when drilling high pressure high temperature (HPHT) wells. In the absence of one or more check valves in the BHA, in the event of a "kick" (a sudden increase in fluid pressure) or a sudden influx of gas, from a hydrocarbon-bearing formation, the gas can percolate up and will then tend to expand and flow rapidly up through the bore, and up through the drill string; this is extremely dangerous. The blowout preventer (BOP) provided at the surface of the bore may be used to prevent fluid escaping from the annulus between the drill string and the wall of the hole. However, the BOP can only prevent fluid passing up through the drill pipe by severing it with the blind-shear rams. This would be a last resort method.

Drilling check valves tend to be of the flapper type or the plunger type. Examples of both types of check valve are supplied by DrillMax Inc of Houston, Tex. The different valve types offer different advantages and disadvantages and different operators tend to favour one particular valve form over the other. For example, in flapper type valves the flappers are relatively large and heavy and pivot on a relatively small diameter pin such that there may be a concern that in extreme situations the flappers may become dislodged or misaligned. Also, the spring provided to urge the flapper to close is generally relatively weak, such that reverse flow may be required before the valve will close. However, in the event of reverse flow the large area of the flapper creates a relatively large pressure force tending to close the flapper. Also, an open flapper provides an unobstructed bore.

The plunger type check valves are considered to be more robust by some operators, and as noted above many operators will now require that two plunger type check valves are provided in every drilling BHA, particularly in HPHT wells. However, the presence of sliding parts may increase the likelihood of the valves jamming or sticking. Furthermore, plunger type check valves obstruct the bore, limiting access to tools and devices in the string below the valves.

There are some disadvantages associated with including check valves in the BHA. Primarily, incorporating one or more check valves in the BHA prevents the drill string from self-filling as the drill string is made up and tripped or lowered into the bore in preparation for a drilling operation. To avoid the drill string collapsing due to the hydrostatic pressure exerted on the string by the fluid in the annulus, the operator has to "top fill" the drill string at intervals as the drill string is tripped into the bore.

It is known to provide flapper type check valves having an orifice in the flapper. This minimises the need for top filling, but the valve does not provide a complete pressure barrier and relying on such a valve may be unacceptable to some operators, particularly in HPHT wells. Alternatively, flapper type valves are available in which a sprung latch initially holds the flapper partially open, allowing self-filling. However, as soon as any fluid is pumped through the string, for example, a shallow test of the flow activated tools in the BHA, or to ensure that the jetting nozzles and the drill bit are not blocked, the flapper will open, releasing the latch, such that the flapper closes when the pumps are turned off. The drill string must then be top filled for the remainder of the tripping operation.

WO 2008/005289 describes a downhole well control device that includes a bypass one-way valve. However, as best understood, the one-way valve appears to be provided in combination with a bypass valve to permit flow from a pipe bore into an annulus when the bypass valve is open but to prevent flow from the annulus into the pipe bore.

Check valves or floats are used in non-drilling operations in combination with relatively large diameter bore-lining tubing such as casing and liner. Davis-Lynch, LLC offer Davis Self-Filling Float Shoes and Float Collars and Halliburton also offer an Advantage IPV Insert Poppet Valve, as described in U.S. Pat. No. 5,647,434. These valves or floats are run into a bore on the lower end of a string of bore lining casing or liner. Top filling a casing or liner string is relatively straightforward, due to the large diameter of the tubing. However, such check valves and floats are occasionally initially held open, for example by locating beads or balls between the valve member and valve seat, which balls or beads may be displaced by pumping fluid down through the string, allowing the valve to close. This obviates the requirement for top filling, however the primary reason for initially holding the valve open is to minimise the pressure surge created by running the large diameter tubing into the bore; the string is likely to be only slightly smaller than the bore, such that fluid would otherwise be trapped in the bore ahead of the string and the resulting pressure increase could damage or break down the formation, compromising subsequent cementing and production operations. However, the reduction in the risk of damaging the formation due to a pressure surge must be balanced against the risks involved in running an open large diameter string into the bore, such that some operators prefer to maintain the valves or floats closed, and run the tubing in relatively slowly. Also, if it is considered necessary or desirable to circulate fluid through the string including a valve held open by beads or balls, for example to facilitate progress of the string through a tight spot in the bore or to displace settled cuttings, an initially open valve will then close.

Once at the desired depth and following a cementing operation, the heavier liquid cement that has been pumped down through the string and the valve, and up into the annulus, will not be able to u-tube back into the casing/liner through the closed valve whilst the cement is setting.

U.S. Pat. No. 6,401,822 to Baugh describes a check valve assembly for the bottom of a casing string which is configured to provide a relatively high open area from a variety of flow paths to allow the string to be run in relatively quickly without fluid pressure build up in the formation. Multiple check valves are provided to provide for assurance of ultimate closure. The various flow paths and the check valves are closed by dropping a ball into the string when the casing has reached to desired depth.

SUMMARY OF THE INVENTION

According to the present invention there is provided a drilling method comprising:
 a) running a drill string part way into a bore; then
 b) pumping fluid through the drill string; then
 c) running the drill string further into the bore; and then
 d) reconfiguring a check valve located towards the distal end of the drill string from a running configuration, in which the valve permits flow both up and down the string, to a drilling configuration in which the check valve permits flow down through the string but prevents flow up through the string.

The method thus allows the incorporation of a float or one-way valve in a drill string while still permitting the string to self-fill as the string is run into the bore. This saves the operator considerable time as there is no requirement to top fill the string; top filling operations may typically add two hours to the time required to run a drill string. Accordingly, the absence of the requirement to top fill the string represents a significant saving in time and thus expense for the operator. Also, top filling a drill string invariably results in spillage and splashing of drilling fluid around the rig area, which fluid must then be cleaned up to maintain a safe working environment. The ability to pump fluid through the string from surface also offers numerous advantages, as will be described. For example, it is generally considered good practice to circulate fluid through a string from time to time during run in to break the gel strength of the drilling fluid and avoid settlement of solids, and ensure that the string has not been plugged off at some point, for example at the jetting nozzles in the drill bit. Also, fluid may be pumped through the string to conduct a shallow test of the flow activated tools in the BHA.

The check valve may be provided in the drill string primarily as a safety feature. In the event of a sudden influx of fluid, typically gas, from a formation into a bore, and thus into the drill string, the valve will act as a non-return valve and prevent the fluid flowing to surface through the string (fluid flowing up the annulus may be contained by the BOP). However, the risk of such an occurrence is higher during the drilling operation, and higher still during tripping out of the drill string, when the withdrawal of the string may swab the bore and create an influx of fluid into the bore. There is normally minimal risk of such an occurrence as the drill string is being run or tripped in to the bore from surface, such that the valve may be safely maintained in a fully open or dormant condition during this phase of the drilling operation. Unlike a casing or liner string, the relatively small diameter of the drill string makes the occurrence of a damaging pressure surge, even with a closed valve, most unlikely. However, embodiments of the present invention may include providing a flow restriction in the drill string to limit the rate at which fluid may flow up through the string while the drill string check valve is open. This flow restriction may take the form of a conventional ported flapper check-valve, which opens to permit flow down through the string but closes to restrict flow up through the string, a port in the flapper permitting a degree of flow up through the string sufficient to allow the string to self-fill. The flow restriction may be positioned below the drill string check valve.

The check valve may be reconfigured at any convenient point, for example during running in or shortly before drilling is to commence. This flexibility is important to allow the operator to make the tool safe at any point should circumstances change.

In certain embodiments the check valve cannot subsequently be reconfigured from the drilling configuration. In such a case the operator can be assured that the check valve will remain in the drilling configuration and will not be accidentally reconfigured to the running configuration.

The method may comprise, at step b), pumping fluid at a level sufficient to test an MWD or other flow-operated tool provided in the drill string. This allows the operator ensure that tools in the string are operating correctly while the tools are at a relatively shallow depth, such that the tools may be retrieved relatively easily if any fault or problem is detected. The flow path of the fluid through the drill string at step b) will typically be the same as the circulation of fluid during a drilling operation, and all of the fluid pumped through the string may be directed through the drill bit jetting nozzles.

The method may comprise repeating step b) after step c).

The method may comprise one or more of the further steps of: e) pumping fluid through the drill string and the check valve in the drilling configuration; and f) drilling the bore.

In the drilling configuration and under normal drilling fluid circulation rates the open check valve may be configured to contribute minimal circulating pressure drop, for example less than 3.45 MPa (500 psi).

The method may comprise the further step of providing a bypass valve in the drill string, and optionally opening the bypass valve. The bypass valve will typically be located towards the distal end of the drill string and may be located above or below the non-return valve, or non-return valves may be provided both above and below the bypass valve. The bypass valve may be opened for a variety of reasons: cleaning the bore; delivery of LCM; allowing the string to be tripped dry. However, the provision of a bypass valve creates another potential leak path into the string, and when open the bypass valve provides a direct path for fluid to flow into the drill string from the annulus. Thus, it may be advantageous to provide an activated non-return valve above the bypass valve, particularly when the bypass valve is open, or to be opened. Accordingly, the method may comprise activating a non-return valve in the drill string above the bypass valve and then subsequently activating the bypass valve.

The check valve may be returned to the running configuration from the drilling configuration. In certain embodiments the valve may be repeatedly cycled between the running and drilling configurations.

Multiple check valves may be provided, and the check valves may be configured to be independently reconfigured, in certain embodiments by use of a common activating device.

According to another aspect of the present invention there is provided a drill string check valve for location towards the distal end of a drill string, the valve being reconfigurable from a running configuration to a drilling configuration, in the running configuration the valve permitting flow up through the valve and permitting fluid to be pumped down through the valve, and in the drilling configuration the valve permitting fluid to be pumped down through the valve but preventing flow up through the valve.

The invention also relates to a drilling bottom hole assembly (BHA) including or operatively associated with such a valve. The valve may be located above an MWD tool provided in the BHA. Embodiments of the invention may further comprise a BHA including a bypass valve.

Two or more drill string check valves may be provided, and in many instances the valves will be provided in pairs, thus providing additional safety through redundancy. Where multiple valves are provided, in the drilling configuration the valves may operate independently such that, for example, if one valve is jammed open the other valve may still close. Multiple valves may be provided in a common valve assembly.

The drill string valve may be provided in combination with a bypass valve and may be provided above or below a bypass valve. A bypass valve has one or more ports in the wall of the body to allow fluid to flow directly to the annulus, bypassing the section of the drill string below the bypass valve. Valves in accordance with the invention may be provided both above and below a bypass valve.

The check valve may be locked open in the running configuration. The valve may comprise a valve member and the valve member may be locked in an open position in the running configuration, such that the valve member is prevented from closing or opening further. The valve may be fully open in the running configuration.

The check valve may be provided with a lock mechanism for retaining the valve in the running configuration. The lock mechanism may be releasable to permit the valve to assume or move to the drilling configuration. The lock mechanism may be releasable by means of an activating device, which device may be translated through the drill string from surface. The activating device may take the form of a ball, dart, plug or the like. The activating device may create a flow restriction in the valve whereby a pressure differential may be created and utilised to release the lock mechanism. The pressure differential may induce relative axial movement between parts of the valve, which may be parts of the valve body.

The activating device may be configured to substantially occlude or restrict the valve. The lock mechanism may be adapted to be released by a first pressure differential acting across the activating device. The lock mechanism may be adapted to release or reconfigure the activating device in response to a higher second pressure differential. A released activating device may then move to a catcher which retains the device and permit fluid bypass around the device. Preferably, the bypass flow area is no smaller than any other flow area constriction in the check valve, assisting in minimising the pressure used by the check valve; this may be less than 3.45 MPa (500 psi) in normal drilling mode.

Preferably, the check valve is capable of withstanding significant pressures from below, for example in excess of 20.7 MPa (3000 psi), or 51.7 M Pa (7,500 psi).

Alternatively, or in addition, the lock mechanism may be releasable to permit the valve to assume the drilling configuration in response to a control signal relayed from surface. The signal may be transmitted by any suitable means, including but not limited to: mud pulse telemetry; an electrical signal; drill string movement, for example coded rotational movement; or one or more RFI chips pumped down through the string. The lock mechanism may include appropriate sensors for detecting or receiving the control signal, or the signals may be detected or received by sensors forming part of another apparatus, for example the sensors provided in an MWD, LWD or rotary steerable drilling system. The lock mechanism may include appropriate controls for the drill string check valve, or these controls may be provided in another apparatus, such as the MWD, LWD or rotary steerable drilling system. A signal may be generated and transmitted to surface on activation of the valve.

In the drilling configuration the check valve may function as a one-way or non-return valve. The valve may be normally-closed in the drilling configuration, that is in the absence of external influences the valve assumes a closed configuration, but will open in response to flow down through the string.

Where two or more check valves are provided the valves may be of the same or similar form or may take different forms.

The check valve may be a plunger or poppet valve, that is a valve comprising a flow passage or hole and a cooperating valve member mounted on a shaft or valve stem. The valve stem is mounted in a valve guide. A spring or other biasing arrangement urges the valve member to close the flow passage.

Alternatively, the valve may be a flapper valve.

The check valve may be provided in combination with a LWD system including a fishable nuclear source. The valve may be positioned below the source, or may be positioned above the source and be configured to permit the source to be fished through the valve, or elements of the valve may be fishable to provide access to the source. In one embodiment the check valve may be reconfigurable from the drilling configuration to an open configuration which provides for access to the source. The check valve may be closed once the source has been retrieved.

According to an alternative aspect of the present invention there is provided a drill string BHA comprising at least two check valves, the valves being reconfigurable from a running configuration to a drilling configuration, in the running configuration the valves permitting flow up through the valve and permitting fluid to be pumped down through the valve, and in the drilling configuration the valves being independently operable and permitting fluid to be pumped down through the valve but preventing flow up through the valve.

According to a further aspect of the invention there is provided a downhole poppet valve comprising a body defining a flow port in a flow passage, a valve member configured to close the port, a valve stem for the valve member, a body-mounted valve guide for the stem, and a valve guide-mounted lock member for releasably retaining the stem relative to the valve guide whereby the valve may be locked open.

The valve may be utilised as the valve or drill string valve in accordance with the first and second aspects of the invention as described above and may include similar features, or operate in a similar manner, to the valves as described above.

The lock member may be radially movable to engage and disengage the valve stem. An inner end of the lock member may engage the stem and an outer end of the member may cooperate with a valve control member. The lock member may be biased to disengage from the valve stem. The lock member may be operatively associated with a shear pin or ring.

The valve guide may comprise a central part for receiving the stem and a radial part extending between the central part and the body. The lock member may extend through the radial part.

The valve member may be in the form of a plug. The valve member may be conical. The valve member may be configured to cooperate with a seat provided around the flow port.

The valve may activated by application of an axial compression force to the body. The body may comprise two or more members and the members may be configured to be relatively movable in response to a predetermined force, the relative movement actuating or permitting movement of the lock member. For example, the lock member may be supported in an extended position by a body member and may be permitted to retract on movement of the body member. The body members may be retained in an initial position by a releasable retainer, for example a shear pin.

The flow port and valve guide may be mounted on a body member such that there is no relative movement between the flow port and valve guide.

The lock member may be biased towards a retracted stem-releasing position, such that when a restraint on the lock member is removed the lock member retracts and permits movement of the stem.

The body may be configured to create a piston whereby an axial pressure force may be applied to the body. The body may be configured to cooperate with an activating device, for example a ball, dart, plug or the like, to create a piston. The body may comprise a seat to cooperate with the activating device. The valve may be configured to release the activating device. For example, a first fluid pressure force may be utilised to activate the valve and a second higher fluid pressure force may then be utilised to release the activating device. The activating device may be released together with a seat, such that the internal diameter of the body is larger following the release of the activating device and the seat. The seat may be formed by an upper end of a sleeve. The sleeve may be retained relative to the body by releasable members, such as shear pins.

The body may include, or may be provided in combination with, a catcher for an activating device. The catcher may be configured to accommodate an activating device and a seat for the device. The catcher may define a bypass which directs fluid around the activating device. The flow area of the bypass may be no smaller than any other flow area restriction in the fully open valve, that is, at least as large as the minimum flow area defined by the body.

The valve member may be located on an upper end of the valve stem. Alternatively, the valve member may be located on a lower end of the valve stem, and the valve stem may extend through the flow port.

Two or more valves may be mounted in a common sub. The valve bodies may be configured such that an axial force pressure force applied to a lower valve is transferred to the upper valve body. Accordingly, the valve bodies are configured to withstand significant compressive force.

According to the present invention there is provided a drilling method comprising:
a) running a drill string into a bore;
b) pumping fluid through the drill string;
c) translating an activating device through the drill string to engage with a check valve located towards the distal end of the drill string and create a flow restriction;
d) utilising a fluid pressure differential created across the activating device to reconfigure the valve from a dormant configuration, in which the valve permits flow both up and down the drill string, to an active position in which the valve permits flow down through the string but prevents flow up through the string; and
e) further translating the activating device to a catcher.

According to another aspect of the present invention there is provided a drill string check valve for location towards the distal end of a drill string, the valve comprising a body defining a flow passage and a hinged flapper, in a dormant configuration the flapper being retained in an open position by a retainer, the body configured to cooperate with an activating device which has been translated through the string to reconfigure the retainer to permit the flapper to close and the valve to assume an active configuration in which the valve permits fluid to be pumped down through the valve but prevents flow up through the valve, the body and the activating device further being configured to release the activating device and permit the activating device to translate further through the body.

The valve may be arranged whereby the activating device engages the body above or below the flapper.

The body may define a restriction to engage the activating device, whereby a force may be transmitted to the body by the device. The restriction may be in the form of a seat. The force may thus be utilised to reconfigure the retainer. The retainer may include an element which retains the flapper in the open position and is axially movable to release the flapper. The retainer may be locked or latched in the reconfigured condition, or may be further reconfigured to a flapper retaining configuration, for example the retainer may include a j-slot arrangement and an appropriate biasing arrangement.

At least one of the body restriction and the activating device may be reconfigurable to release the device once the retainer has been reconfigured. For example, the seat may include radially movable members or dogs which may be translated by the passage of the activating device to reconfigure the retainer.

According to an alternative aspect of the present invention there is provided a drilling BHA check valve configurable to permit flow in a downhole direction and prevent flow in an uphole direction, the valve comprising a body defining a flow port in a flow passage, and a valve member mounted in the body and configured to tend to open the port in response to downhole flow and to close the port in response to uphole flow, the flow port and valve member comprising opposing sealing faces and wherein the sealing faces are formed of a rigid erosion-resistant material.

Typically, the sealing faces on known BHA check valves are provided with elastomeric seals, to ensure that there is no leak path between the faces, as may otherwise occur if, for example, a particle becomes trapped between the faces. Conventionally, the use of rigid materials to form the sealing faces is avoided. In the event of such sealing faces not sealing completely, a high pressure differential across the valve will result in a high velocity leak of fluid carrying abrasive material that will soon cut through the material forming the sealing faces and the valve will fail. However, with this aspect of the invention, the use of very hard materials minimises the risk of erosion of the sealing faces, such that the sealing function is retained.

The sealing faces may comprise an engineered ceramic or tungsten carbide. The sealing faces may comprise a solid, and may be formed by inserts. The inserts may be mounted in pockets such that pressure forces acting on the valve tend to urge the inserts into the pockets.

The valve member may be biased to close the flow port, typically by a spring. The spring may take any appropriate form and may comprise a material that is one or more of high temperature resistant and corrosion resistant.

Elements of the valve may be formed of one or more of 316 stainless steel, 17/4 PH stainless steel or austenitic nickel-chromium-based alloy, such as sold under the Inconel trade mark. The latter two of these materials are also substantially stronger and thus allow the working pressure rating of the check valves to be significantly increased over conventional drill string check valves.

Surfaces of the valve exposed to high velocity flow may be coated with an appropriate erosion-resistant material, such as ceramic, tungsten carbide or a diamond-like material.

Conventional drill string check valves have a relatively short working life and must be continually repaired and replaced. This improved embodiment would last much longer, requiring minimal change-out and disposal of the old parts. Of course the increase life span of these check valves would thus reduce the instances of failure of these safety critical devices.

Check valves made in accordance with the different aspects of the present invention may be capable of holding relatively high pressures, typically in excess of 20.7 MPa (3000 psi). Further, check valves made in accordance with embodiments of this particular aspect may be rated in excess of 68.9 MPa (10,000 psi).

According to an aspect of the present invention there is provided down hole actuating apparatus, the apparatus comprising a tubular body having a seat configured to cooperate with an activating device to create a piston whereby an axial pressure force may be applied to the body, the seat and activating device being releasable from the body such that the internal diameter of the body is larger following the release of the activating device and the seat.

The seat and activating device may be translated to a catcher where fluid bypass is provided around the seat and device.

In addition, the actuating apparatus may include the facility for actuating a related tool or device utilising control signals relayed from surface, and utilising elements of other downhole tools such as MWD tools, as described in greater detail with reference to some of the other aspects of the invention.

Another aspect of the invention relates to downhole apparatus comprising:
 a bypass valve for location in a downhole tubing string;
 a check valve for location in the tubing string above the bypass valve, the check valve being reconfigurable from an inactive configuration to an active configuration, in the inactive configuration the check valve permitting flow both up and down the string, and in the active configuration the check valve permitting flow down through the string but preventing flow up through the string.

A still further aspect of the invention relates to a downhole flow control method comprising:
 opening a bypass valve provided in a downhole tubing string; and
 reconfiguring a check valve in the tubing string above the bypass valve from an inactive configuration to an active configuration, in the inactive configuration the check valve permitting flow both up and down the string, and in the active configuration the check valve permitting flow down through the string but preventing flow up through the string.

The method may further comprise:
 closing the bypass valve; and
 reconfiguring the check valve from the active configuration to the inactive configuration.

The check valve may be reconfigured from the inactive configuration to the active configuration before or after the bypass valve is opened.

The check valve may be reconfigured from the active configuration to the inactive configuration before or after the bypass valve is closed. Those of skill in the art will recognise that certain aspects of the invention may be combined and that various features described with reference to one aspect will have utility in the other aspects and accordingly may be combined with those other aspects.

BRIEF DESCRIPTION OF THE DRAWINGS

These and other aspects of the present invention will now be described, by way of example, with reference to the accompanying drawings, in which:

FIG. 20b is an enlarged view of area 20b of FIG. 20a; and

DETAILED DESCRIPTION OF THE DRAWINGS

Figure 1:
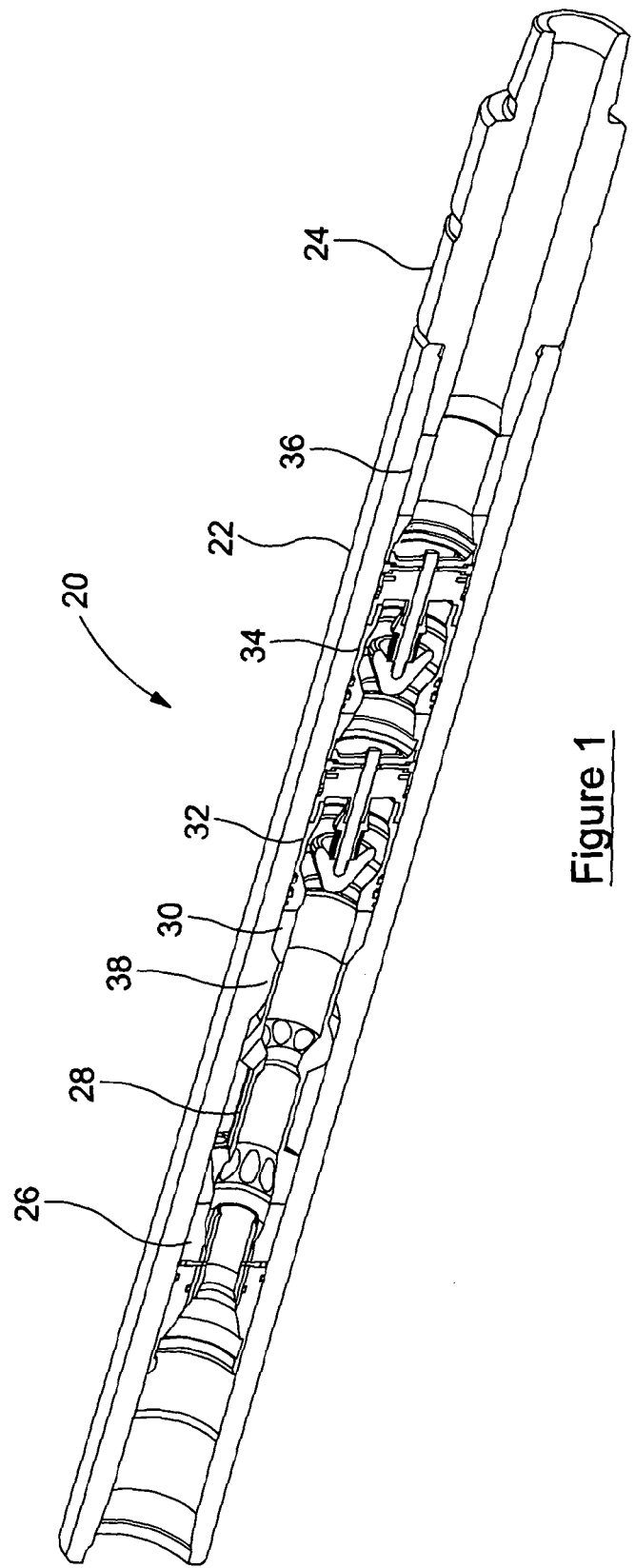
FIG. 1 is a perspective cutaway view of a drill string valve arrangement in accordance with an embodiment of the present invention.
Figure 1A:
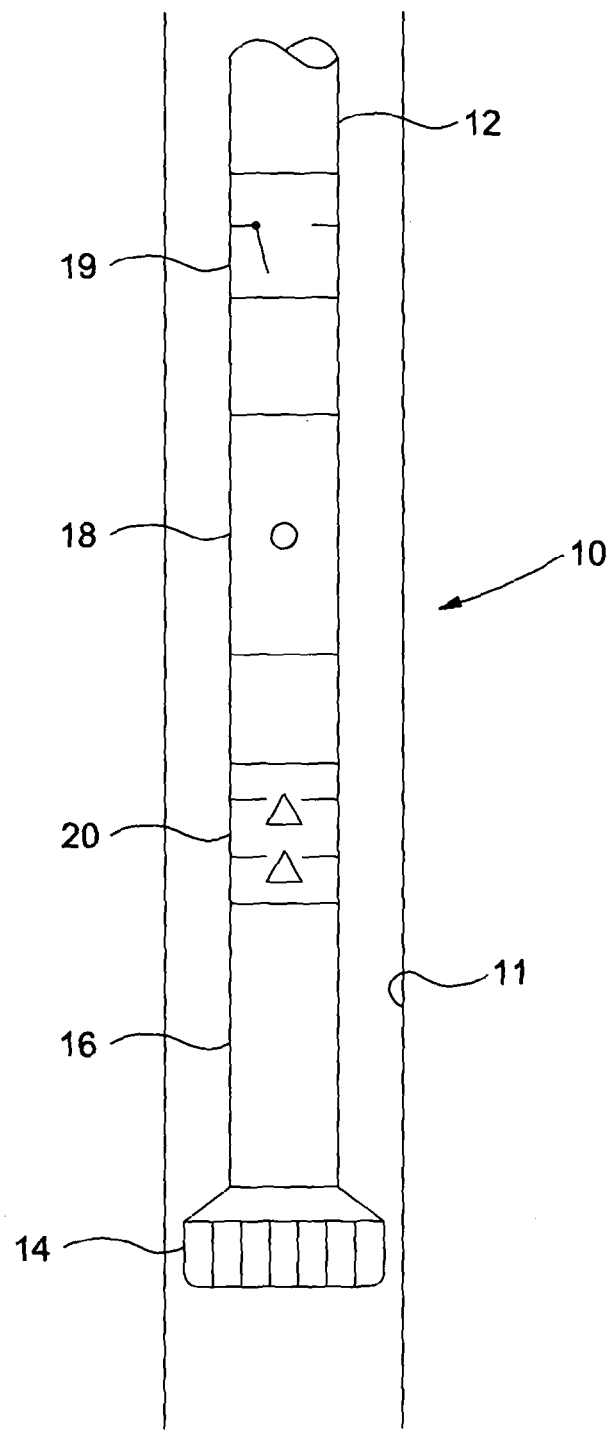
FIG. 1a is schematic illustration of a drilling bottom hole assembly (BHA) in accordance with an embodiment of the present invention.

Reference is first made to FIG. 1a of the drawings, a schematic illustration of a drilling bottom hole assembly (BHA) 10 in accordance with an embodiment of the present invention, shown in a bore 11. The BHA is configured for mounting on a drill string 12 and comprises a drill bit 14, an MWD/LWD tool 16, a tandem plunger-type check valve arrangement 20, a bypass arrangement 18 and flapper-type check valve arrangement 19.

As will be described, the BHA 10 allows an operator to run the drill string 12 into the bore 11 with the valves 20, 19 in an open, running configuration such that the string will self-fill; as the drill string is made up and the BHA moves down into the fluid-filled bore 11, the fluid will flow into the string 12 through the jetting nozzles in the drill bit 14. If desired, the operator may circulate drilling fluid through the string 12 as the string is being tripped into the bore 11 to, for example, carry out a shallow test of the MWD tool 16. Once the string 12 has been run in to an appropriate depth the operator may reconfigure at least the lower valve arrangement 20 to a drilling configuration, ready for a drilling operation, during which the drilling fluid may be pumped down through the string 12 to the bit 14. However, the configuration of the valve arrangement 20 will prevent fluid from flowing up the string 12, as might otherwise occur in the event of a "kick". Subsequently, if it is desired to open the bypass arrangement 18, to provide a route for fluid to flow from the string into the annulus without passing through the lower part of the BHA, the upper valve arrangement 19 may also be reconfigured to provide a barrier to fluid flowing in through the open bypass arrangement 18 and up the string 12.

Reference is now also made to FIG. 1 of the drawings, which is a perspective cutaway view of the drill string valve arrangement 20, in accordance with an embodiment of the present invention. As described above, the valve arrangement 20 is configured to be incorporated in the distal end of a drill string 12 in the bottom hole assembly (BHA) 10, just above the MWD/LWD 16. To permit incorporation in the drill string 12, the valve arrangement 20 includes a robust tubular box-box body 22 which houses all of the working parts of the valve, and a simple pin-pin body 24 which retains the working parts from the lower end of the valve, such that the combination of bodies 22, 24 is a standard pin-box tool.

The body 22 houses six sub-assemblies, from the upper end of the body 22 these being: a power section 26; a fluid bypass/forward thrust transmission section 28; a reverse thrust support 30; an upper check valve assembly 32; a lower check valve assembly 34, and a spacer sleeve 36.

The body 22 is bored out to provide an optimum internal diameter from both ends, with a narrower section defined by a shoulder 38 in a central portion of the bore. As will be described, the shoulder 38 provides support in the event that the check valve assemblies 32, 34 are containing a large pressure from below.

The power section 26 and the bypass section 28 may be readily accessed from the upper end of the body 22, while the other assemblies can be readily accessed from below once the lower body 24 is removed.

Figure 2:
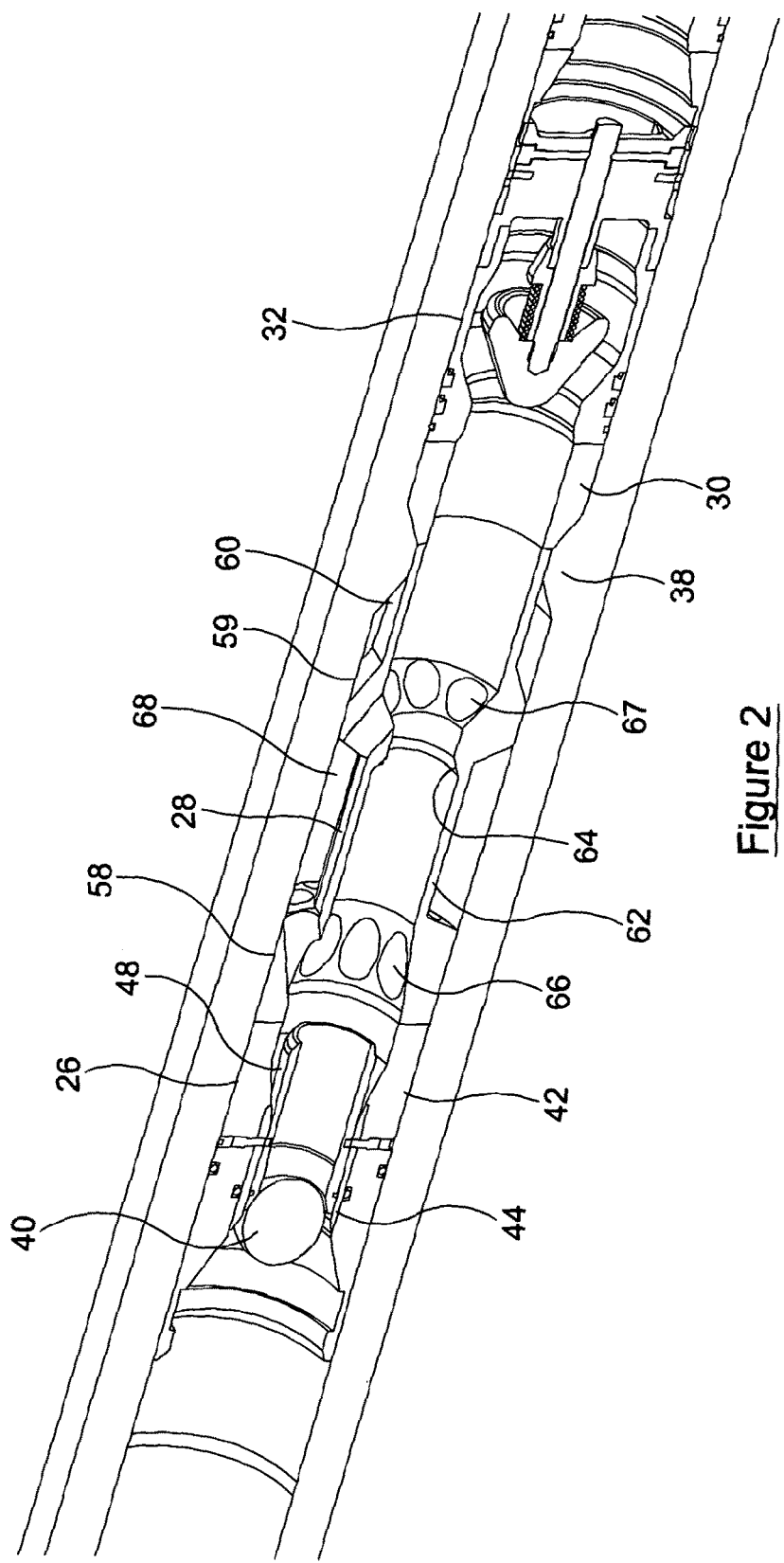
FIG. 2 is an enlarged view of part of the valve of FIG. 1.
Figure 3:
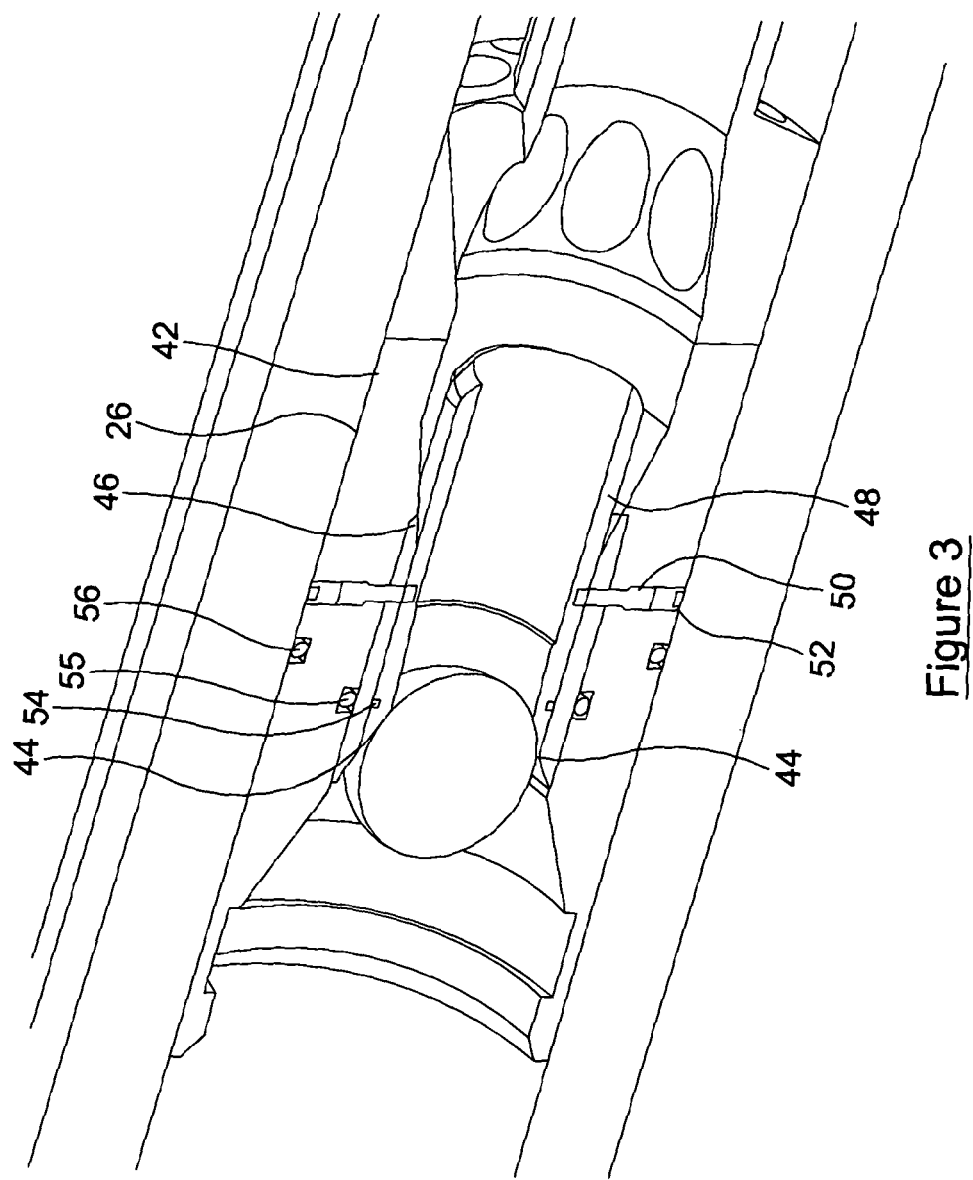
FIG. 3 is a further enlarged view of a power section of the valve of FIG. 1.

Reference is now also made to FIGS. 2 and 3 of the drawings which illustrate enlarged views of some of the upper sub assemblies, and also showing an activating device in the form of a ball 40 engaged with the power section 26.

The power section 26 comprises a power sleeve 42 which fits snugly within the inner diameter of the body 22. A ceramic sleeve 44 is located within the inner diameter of the power sleeve 42, being restrained against downward movement by a ledge 46. A ball seat sleeve 48 sits within the ceramic sleeve 44 and is held in place by four shear pins 50 which extend from the power sleeve 42 and through the ceramic sleeve 44, being retained in the power sleeve 42 by grub screws 52.

The small gaps between the respective sleeves and the power sleeve and the body 22 are sealed by appropriate o-rings 54, 55, 56.

The fluid bypass/forward thrust transmission section 28, as will be described, is utilised to transfer an axial fluid pressure force from the power section 26 to the upper check valve assembly 32 and thus the section 28 includes shoulders 58, 59 which stabilise the section 28 within the internal diameter of the body 22 and a lower sleeve section 60 which extends inside the body shoulder 38 to abut the upper end of the reverse thrust support 30.

The section 28 also serves as a catcher for the ball 40 and ball seat sleeve 48 (see FIG. 10), and thus includes a catcher sleeve 62 including a lower catching profile 64. The shoulders 58, 59 located at the upper and lower ends of the sleeve 62 include circumferentially spaced flow ports 66, 67 such that flow may be diverted around the occluded sleeve 62, through an annulus 68 between the sleeve 62 and the internal diameter of the body 22.

Figure 4:
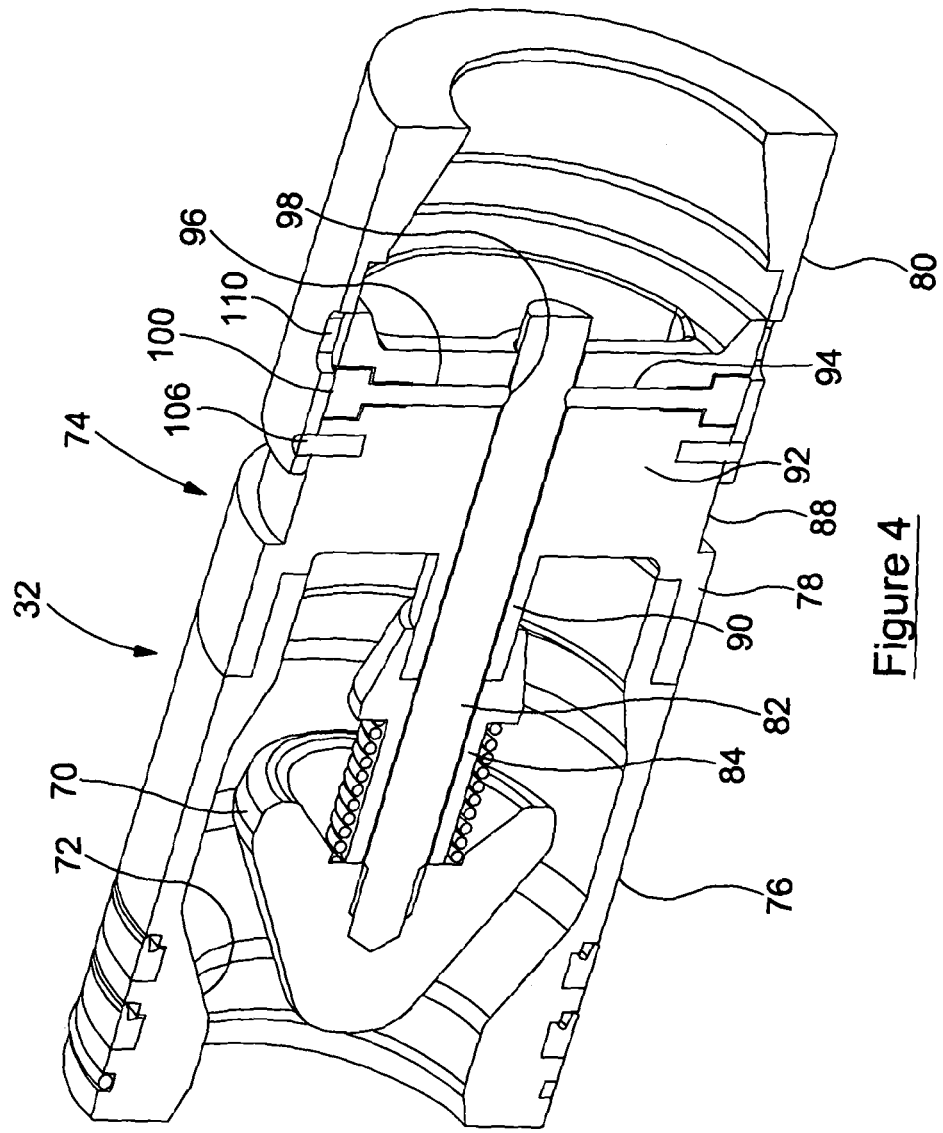
FIG. 4 is an enlarged view of a check valve assembly of the valve of FIG. 1, shown in an inactive configuration.
Figure 5:
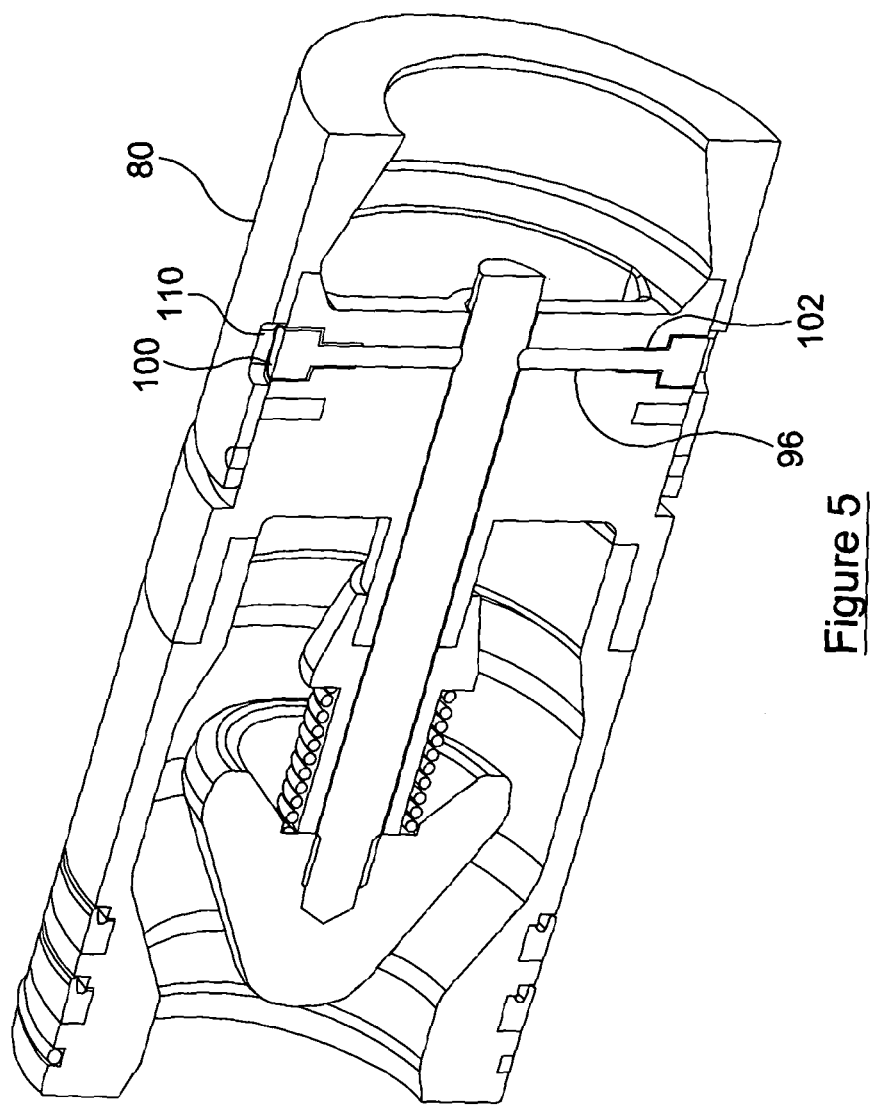
FIGS. 5, 6 and 7 of the drawings illustrate the valve assembly of FIG. 4 as it is reconfigured to an active configuration.

Reference is now also made to FIG. 4 of the drawings, which is an enlarged view of the upper check valve assembly 32 (the lower check valve assembly 34 is identical). FIG. 4 shows the upper valve assembly 32 in its initial position in which the valve is locked open in a running configuration and thus permits both downhole and uphole flow through the valve. In this configuration the valve member or head 70 is fixed spaced from the flow port 72 defined in the upper end of the assembly body 74. The assembly body 74 is generally tubular and comprises three primary elements: a valve head 76; a shaft support 78, and tail sleeve 80. The head 76 and shaft support 78 are press fitted together and the tail sleeve 80 is a sliding fit on the lower end of the shaft support 78.

The valve head 70 is mounted on a stem or shaft 82. A spring housing 84, carrying a coil spring 86, is located on the shaft 82 between the valve head 70 and the shaft support 78.

Figure 8:
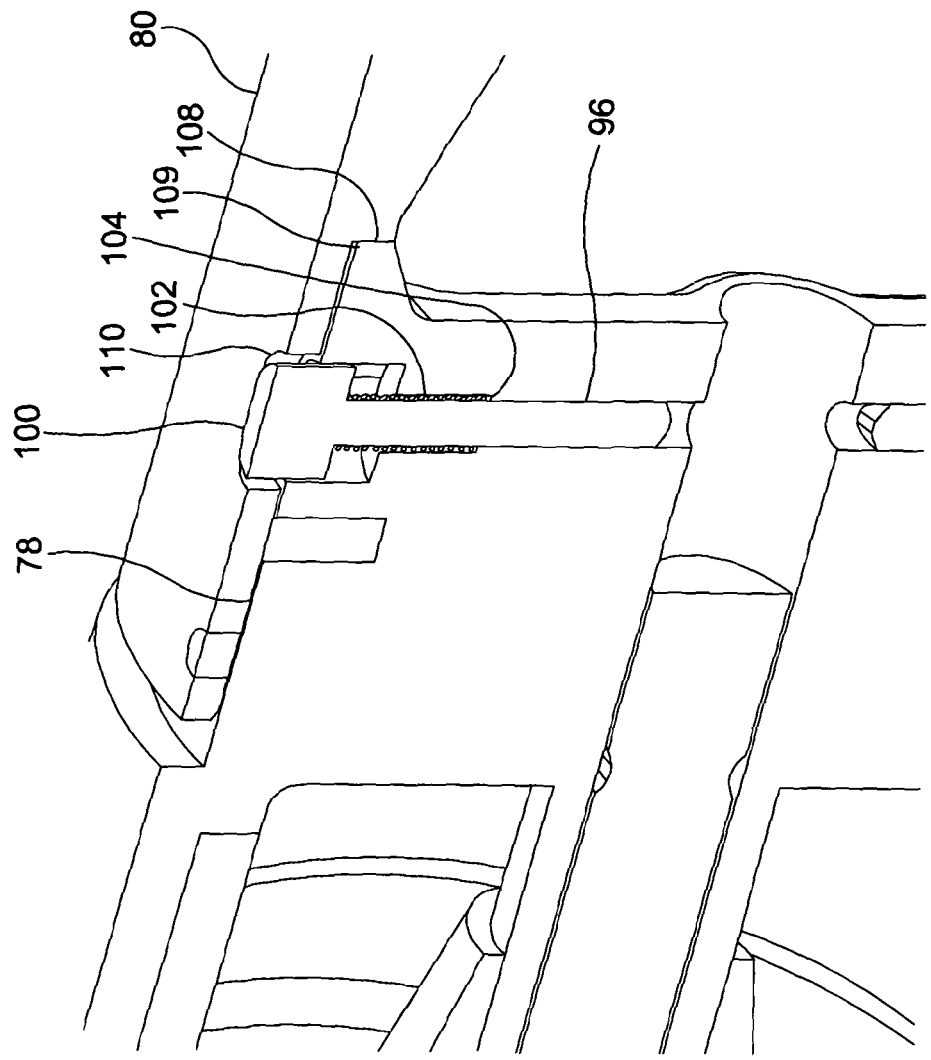
FIG. 8 is an enlarged view showing elements of a lock arrangement for the valve assembly of FIG. 4.

The shaft support 78 comprises an outer generally cylindrical portion 88 and a central shaft collar 90 mounted to the cylindrical portion 88 by two arms 92. The arms are profiled to provide minimum disruption to fluid flowing down through the assembly 32 and incorporate two milled holes 94 accommodating spring loaded shaft retainer pins 96. In the initial position as illustrated in FIG. 4, the inner ends of the pins 96, which are profiled as perhaps best illustrated in FIG. 8 of the drawings, engage a circumferential groove 98 in the shaft 82. Thus, the pins 96 retain the shaft 82, and the valve head 70, in a retracted position, against the action of the spring 86, such that fluid may flow both down and up through the valve.

The pins 96 include elongate heads 100 and light springs 102 (see FIG. 8) act between the heads 100 and a ledge 104 to urge the pins 96 radially outwards. However, in the initial configuration the pins 96 are maintained in a locking position by the sleeve tail 80. A pair of shear pins 106 retain the tail sleeve 80 relative to the shaft support 78.

To activate the valve arrangement 20, and reconfigure the check valves to an active or drilling configuration, an operator drops a ball 40 into the drill string. Under the action of gravity the ball 40 will migrate down the string and ultimately land in the power section 26, as illustrated in FIGS. 2 and 3. If the operator then starts pumping fluid into the string, thus increasing the pressure above the occluded power section 26, the power section 26 acts as a piston with an outer diameter equivalent to the inner diameter of the body 22. This creates an axial force on the power section 26, which is transferred through the bypass section 28 and the reverse thrust support 30, to the upper end of the head 76 of the upper check valve assembly 32. The valve assemblies 32, 34 are thus axially compressed resulting in the shear pins 106 in both assemblies 32, 34 breaking and the tail sleeves 80 moving upwards relative to the respective shaft supports 78 until tail and support shoulders 108, 109 abut. This aligns holes 110 in the tail sleeve 80 with the retaining pin heads 100.

Although not illustrated in the Figures, there are two pins and corresponding slots in the shaft support 78 and tail sleeve 80 which maintain the appropriate alignment between the shaft support 78 and the tail sleeve 80.

Figure 6:
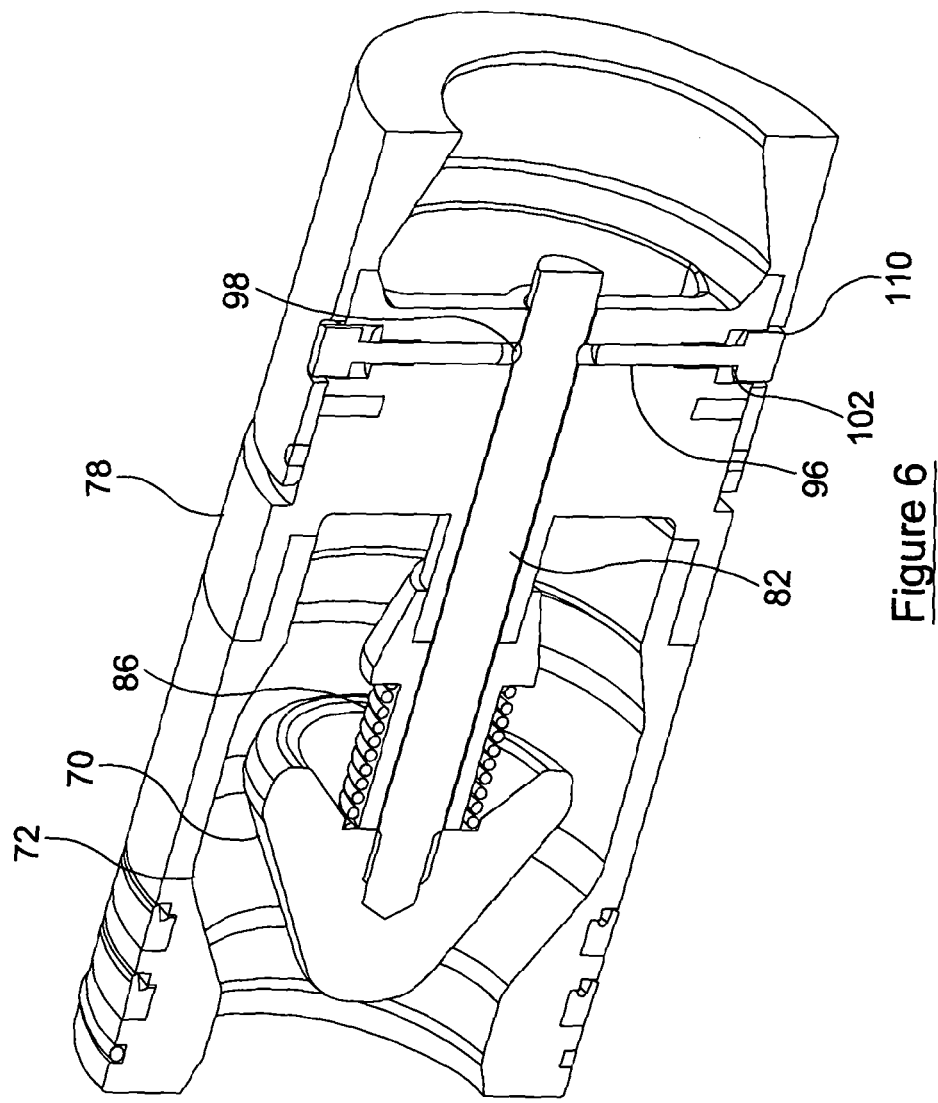

Under the action of the springs 102, the retaining pins 96 are urged outwards, into the holes 110, as is illustrated in FIG. 6 of the drawings. This releases the shaft 82 from the support 78, and the shaft 82 may then move upwards under the force of the main spring 86.

It should be noted that the form of the inner ends of the retaining pins 96 and the groove 98 are such that, even in the event of failure of the light springs 102, the action of the main spring 86 will urge the retaining pins 96 radially outwards once the pin heads 100 are aligned with the respective holes 110.

Figure 7:
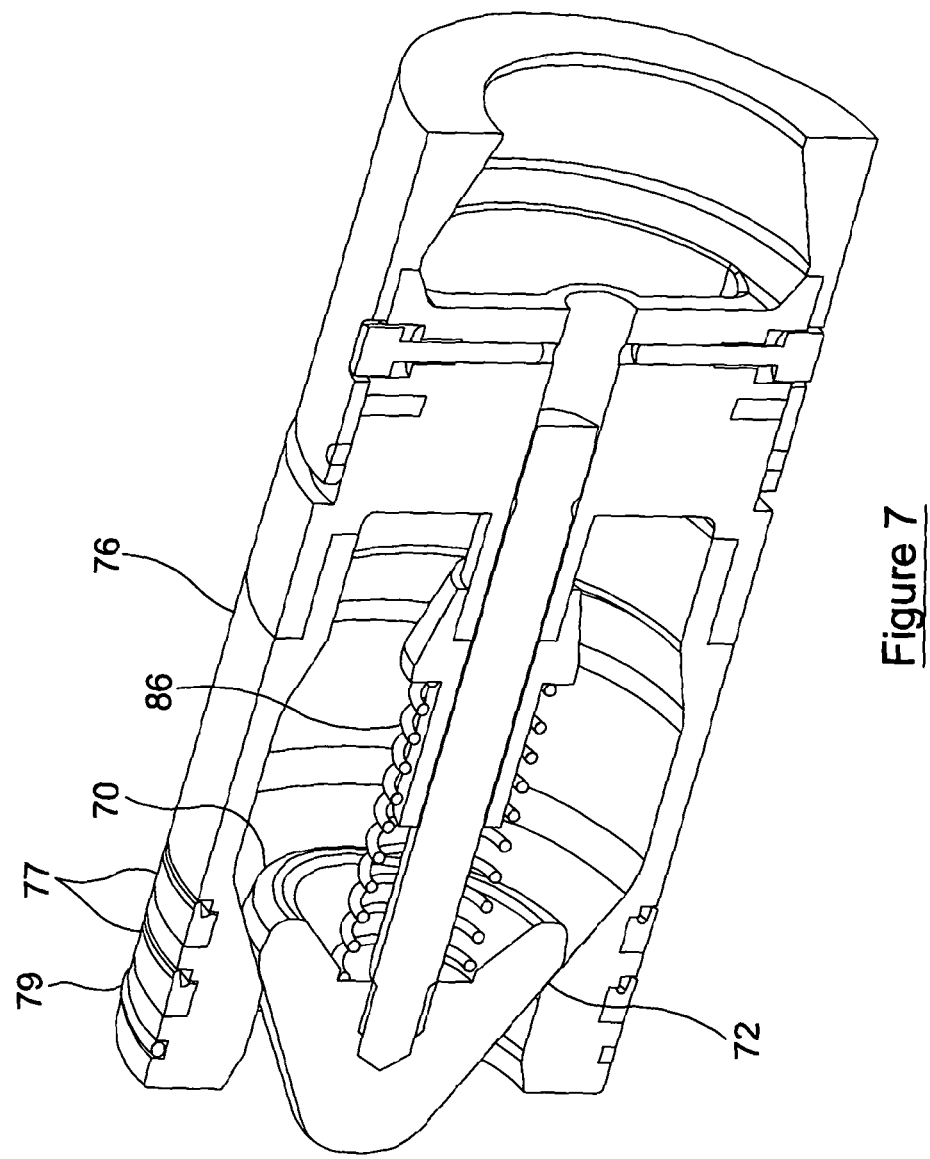

The spring 86 will thus move the valve head 70 upwards to engage with and seal the flow port 72 as illustrated in FIG. 7 of the drawings.

The head 76 carries two high pressure chevron seals 77 to hold pressure from below, the two seals providing 100% redundancy. Also, an o-ring seal 79 will hold pressure from above, although any pressure experienced from above will be significantly lower than that which might be applied from below.

Figure 9:
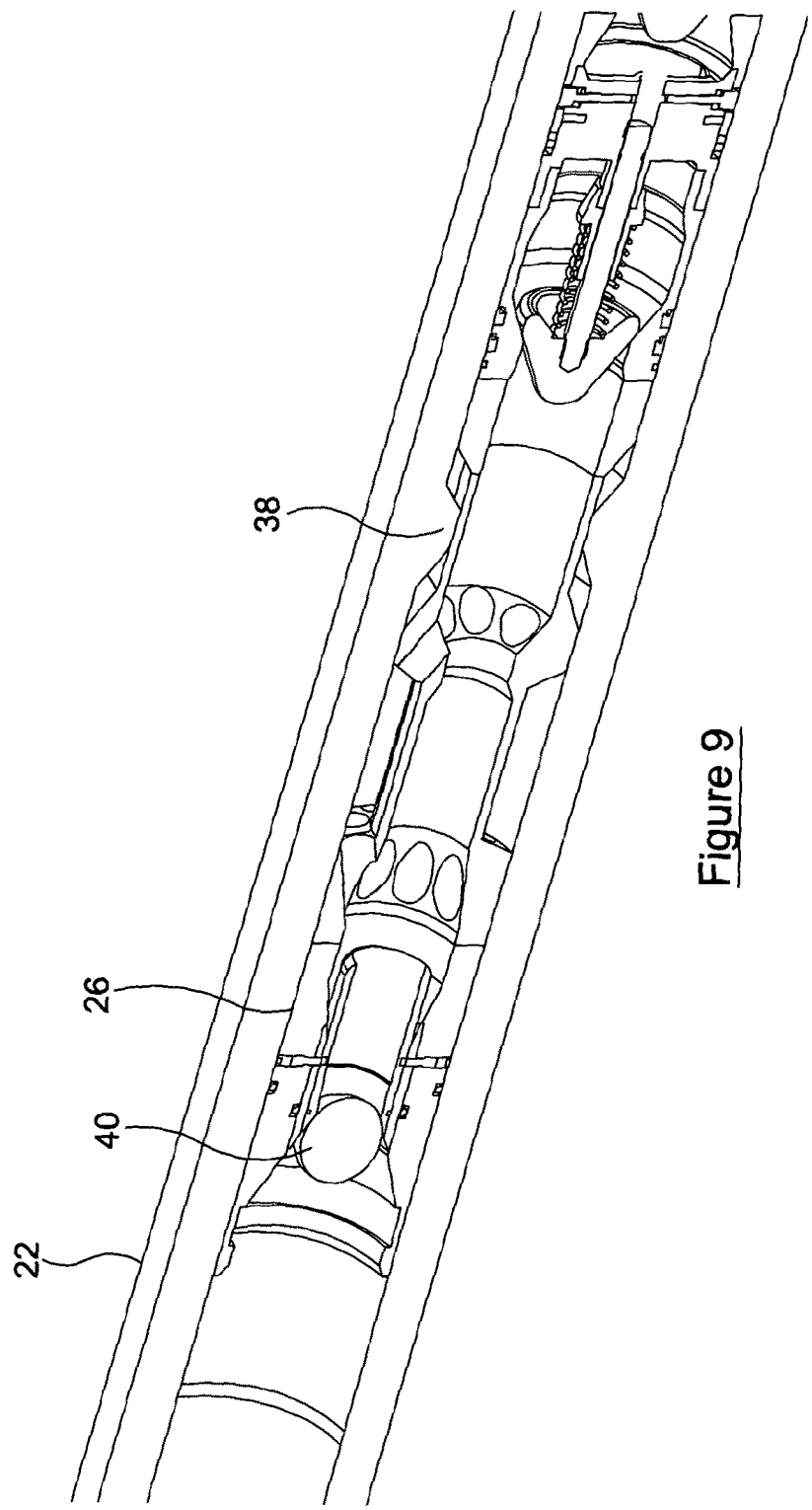
FIGS. 9 and 10 of the drawings illustrate steps in the process of reconfiguring the power section of the valve of FIG. 1 following the activation of the valve.

FIG. 9 of the drawings illustrates the upper end of the valve arrangement 20 following the activation of the valves. A comparison with FIG. 2 will identify the relative downward movement of the upper sub-assemblies relative to the shoulder 38, which resulted in the axial compression of the check valve assemblies 32, 34 and the activation of the valves.

Figure 10:
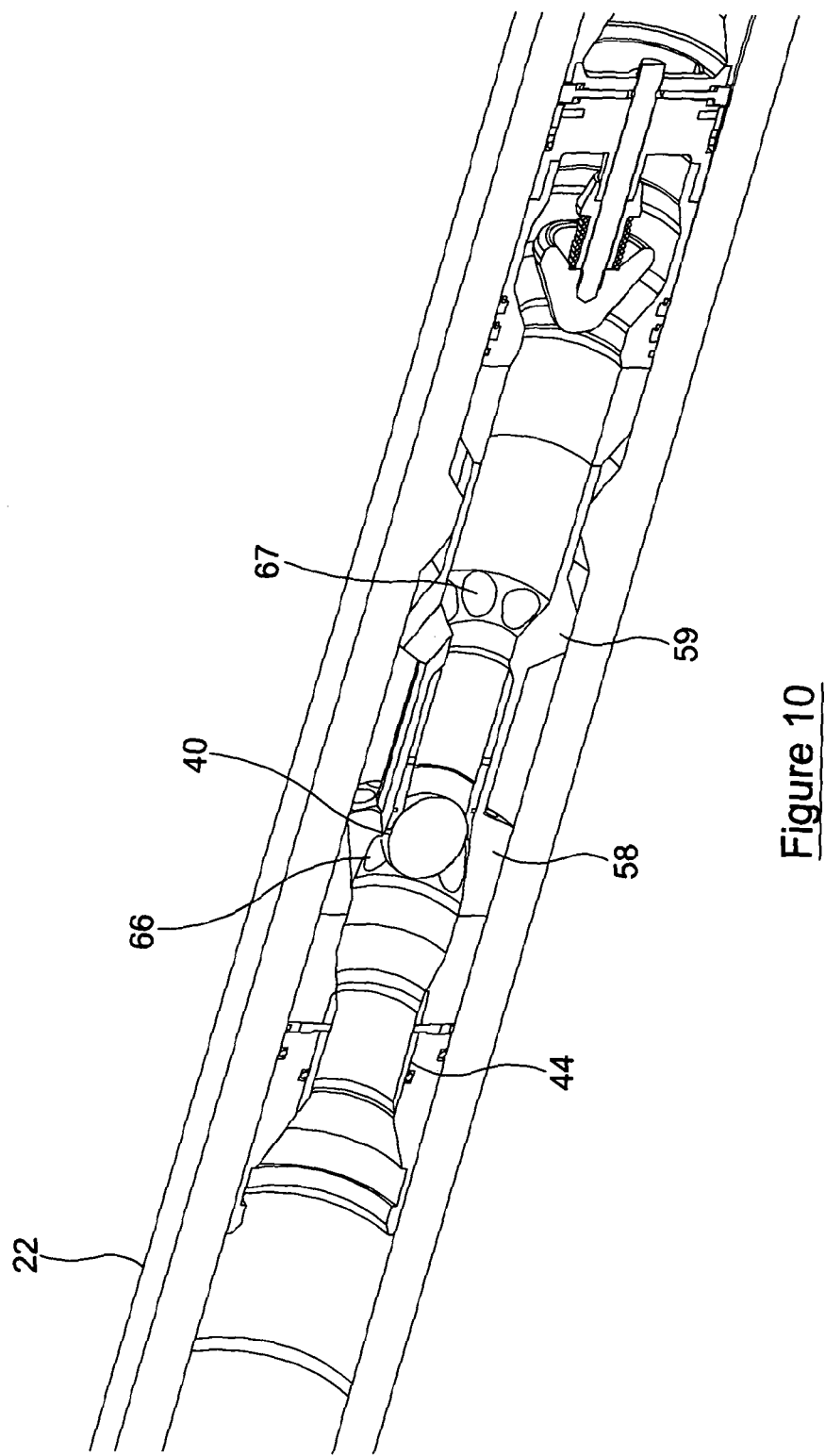

As noted above, once the ball 40 has landed in and occluded the power section 26, a small fluid pressure above the power section 26 acts over the whole axial area of the internal diameter of the body 22. For example, if the bore is 4⅜ in internal diameter and the pressure is 150 psi, the applied force would be 150 psi×15 in²=2,250 lbs, which would shear both of the shear pins 106 in both of the check valves assemblies 32, 34. At the same pressure, the force exerted on the four power section shear pins 50 (on the basis of a 2¼ in outside diameter ball) would be 150 psi×4 in²=600 lbs. Thus, on the basis that the shear pins 50 and 106 are of the same size and material it will take 3.75×2 more pressure to shear the four upper ball seat pins 50, that is a pressure of 1,125 psi. Accordingly, the disclosed arrangement facilitates the sequential operation of the valve arrangement, allowing the valve to be activated initially using a relatively low pressure, and then a significantly higher pressure being required to shear the pins 50 and allow the ball seat sleeve 48 and the ball 40 to move downwards into the bypass section 28, as illustrated in FIG. 10 of the drawings. It will be noted that in this position the upper surface of the ball 40 tends to direct fluid into the upper flow ports 66. In other embodiments a device other than a ball could be utilised, for example, a dart having a conical upper surface. The configuration of the bypass section 28 contributes to the low pressure drop created in the circulating drilling fluid induced by the valve arrangement 20, and the total flow area of the bypass section 28 when accommodating the ball seat sleeve 48 and the ball 40 is larger than the smallest total flow area portion of the valve arrangement, which in this embodiment will be the ceramic sleeve 44.

Valves made in accordance with embodiments of the invention are likely to create a pressure drop of no more than 3.45 MPa (500 psi) when flowing in normal drilling mode, and a valve arrangement 20 constructed in accordance with the illustrated embodiment may create a pressure drop of as little as 0.345 MPa (50 psi).

As fluid may now flow through the bypass section 28, bypassing the ball 40 and ball seat sleeve 48, the valve is now open to downhole flow.

The various elements of the valve arrangement may be suitably treated or coated, for example, with tungsten carbide, to provide protection against mud flow erosion. Also, the flow restriction formed by the power section 26 is lined with the ceramic sleeve 44, which will be resistant to erosion.

The illustrated bypass section 28 is shown as being made in one piece, but could be made in multiple pieces to facilitate fabrication and the milling of the flow ports 66, 67. Other embodiments may also include an additional co-axial pipe between the stabilising shoulders 58, 59 such that the bypassing fluid does not contact the internal diameter of the body 22. The outer pipe could be coated with an erosion resistant material, such as tungsten carbide, or could be ceramic.

Figure 11:
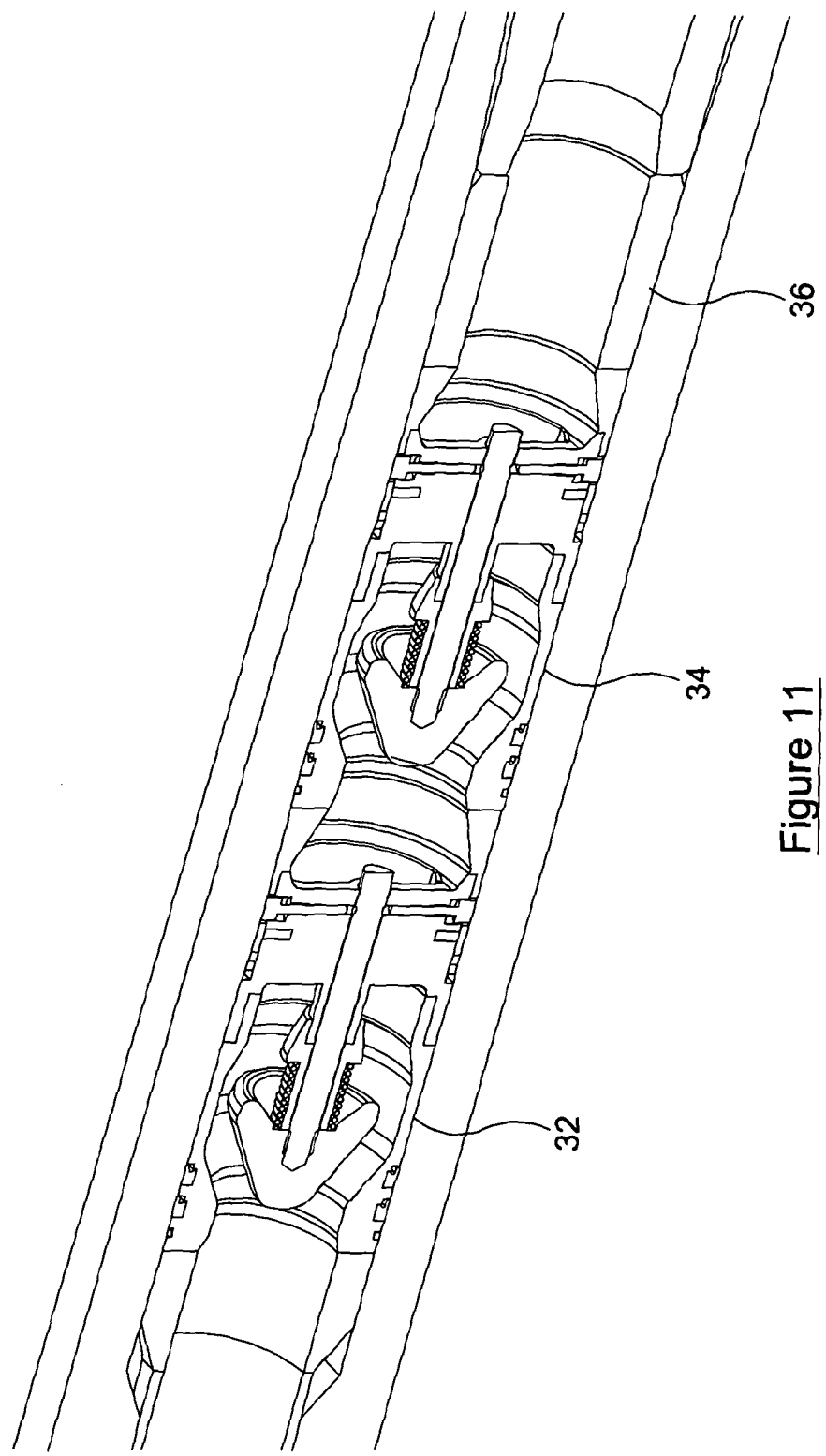
FIGS. 11, 12 and 13 illustrate the two valve assemblies of the valve of FIG. 1 in the active configuration and responding to different flow and pressure situations.

Reference is also now made to FIG. 11 of the drawings, which shows the lower end of the valve arrangement under normal drilling flow conditions, that is with fluid being pumped from surface towards the drill bit 14 on the lower end of the drill string 12. Both of the valves are pushed open by downhole flow and the assemblies 32, 34 are both pushed downwards against the spacer sleeve 36. If necessary, a shorter spacer sleeve may be provided to accommodate repair to the lower box connection.

Figure 12:
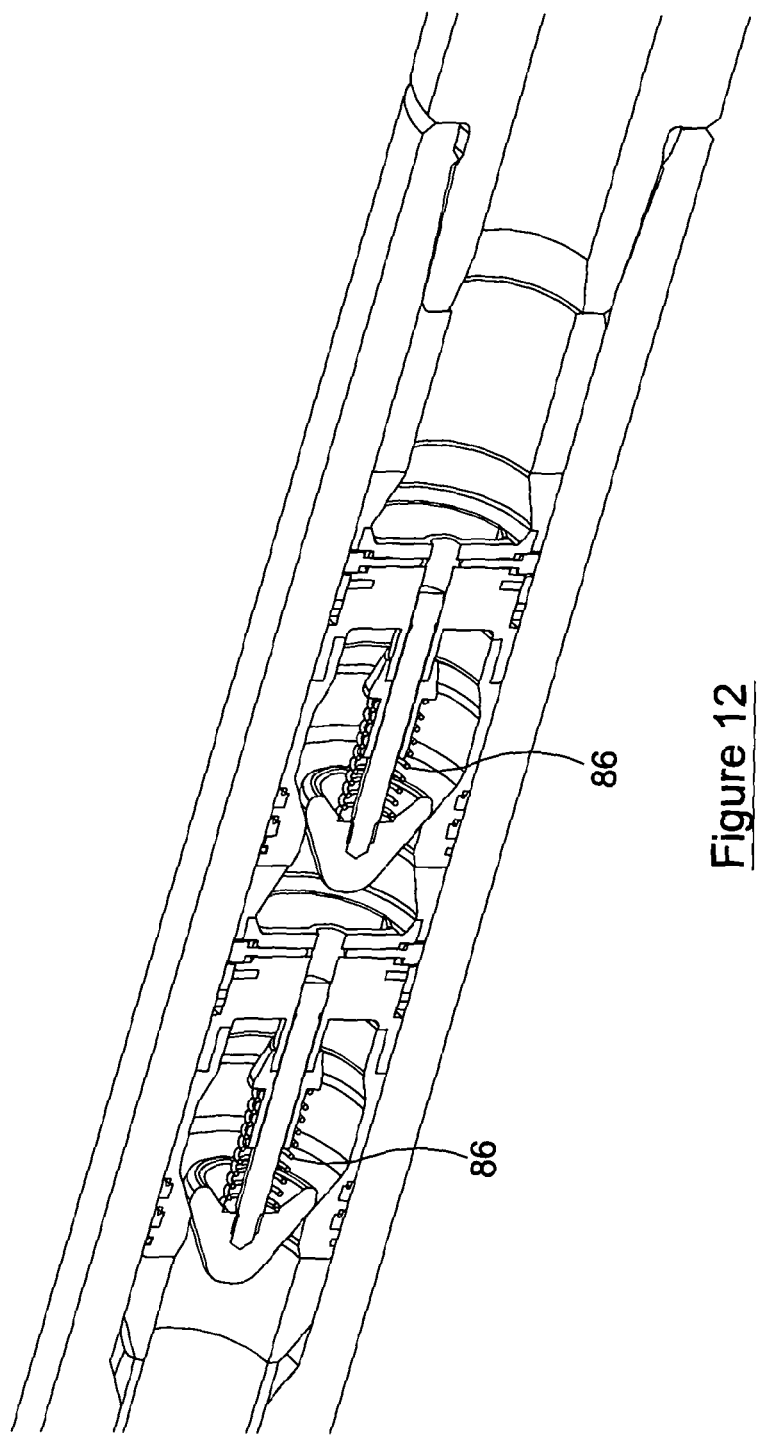

If flow is turned off, the valves will close, under the action of the springs 86, as illustrated in FIG. 12 of the drawings.

Figure 13:
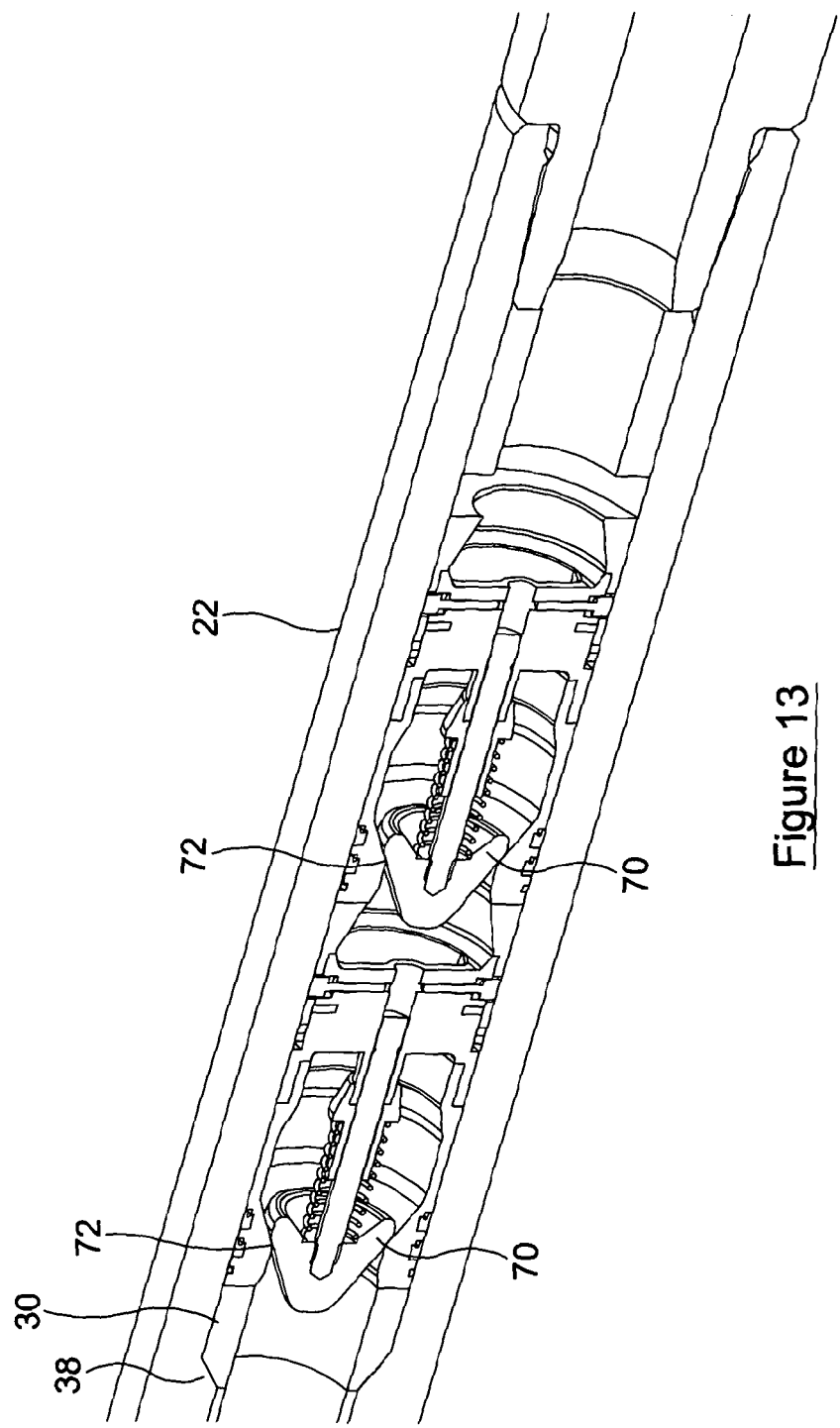

In the event of flow or pressure being applied from below, the valves remain closed, and indeed the pressure differential will urge the heads 70 into tighter engagement with the flow port 72, and the valve assemblies 32, 34 may move upwards within the body 22, as illustrated in FIG. 13 of the drawings. The potentially large forces from below are transferred from the assemblies 32, 34 to the body 22 via the reverse thrust support 30 and the shoulder 38.

Figure 14A:
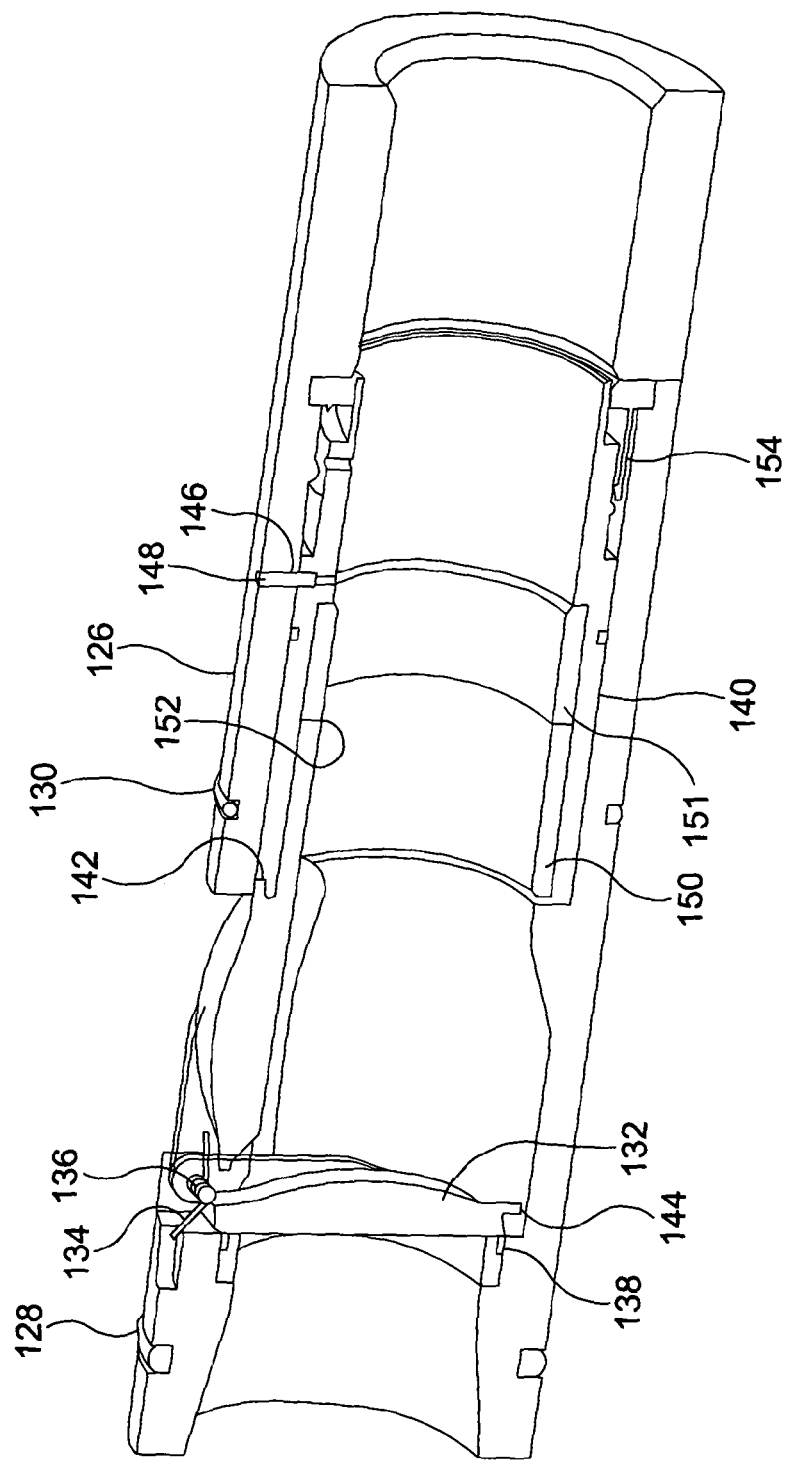
FIGS. 14a and 14b are sectional side views of a valve assembly in accordance with a further embodiment of the present invention.
Figure 14B:
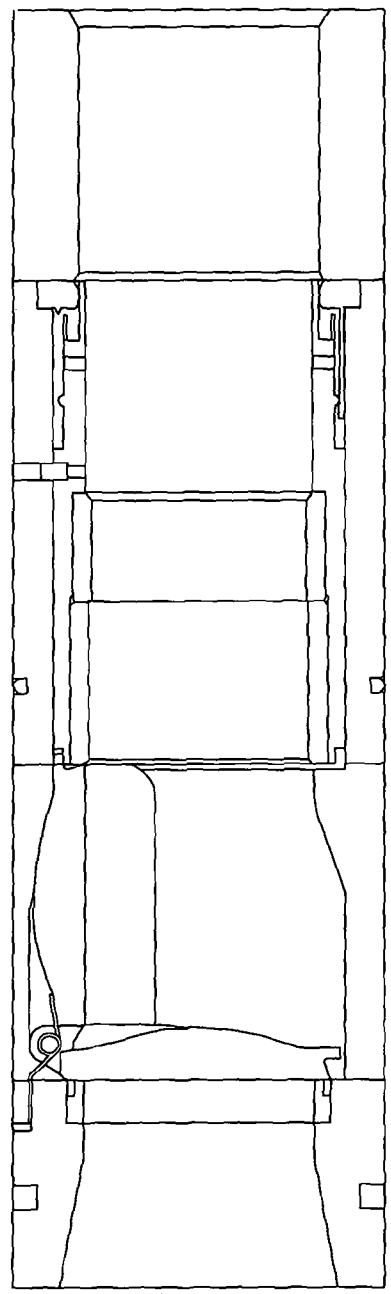

Reference is now made to FIGS. 14a and 14b which illustrate the flapper-type check valve arrangement 19 as illustrated in FIG. 1. The valve arrangement 19 is configured to be located within a tubular valve body (not shown), and one or more assemblies may be provided in the drilling BHA 10. In other embodiments the assembly 19 may be provided in place of plunger or poppet-type valve arrangements 20.

The assembly comprises an elongate tubular body 126 carrying a chevron seal 128 to contain upward pressure, and an o-ring seal 130 to contain downward pressure. A flapper 132 is mounted in the body 126 and a spring 134 mounted on a flapper hinge pin 136 acts to urge the flapper 132 towards a closed position ensuring contact with a seat 138.

A portion of the body 126 is cut away below the hinge pin 136 to accommodate the flapper 132 in the open position while maintaining a relatively large through bore. The flapper 132 is retained in the open position by an axially moveable sleeve 140 located in the body 126 below the flapper 132, an upper end of the sleeve defining a recess 142 which accommodates a tab 144 extending from the flapper 132.

With the valve assembly 122 in the initial, fully open position, the sleeve 140 is fixed in position relative to the body 126 by shear pins 146 retained in the body 126 by grub screws 148.

Within the sleeve are two collars 150, 151, the lower collar 151 defining a small internal shoulder 152. As will be described, the shoulder 152 is intended to co-operate with an activating device.

The lower end of the sleeve 140 is profiled to accommodate a latch 154 between the sleeve 140 and the internal diameter of the body 126.

To reconfigure the valve assembly, an operator will drop or pump a dart from surface, preferably a dart as described in applicant's International Patent Application Publication No. WO/2010/128287 the disclosure of which is incorporated herein by reference in its entirety. Such darts will incorporate keys or dogs sized to co-operate and engage with the shoulder 152 and thus substantially occlude the sleeve 140. Thus, an axial fluid pressure force may be applied to the sleeve 140, and if the force is sufficient the shear pins 146 will fail, allowing the sleeve 140 to move downwardly, the downward movement being retained by the latch 154.

On the sleeve 140 moving downwards, the flapper tab 144 is free of the recess 142, and the flapper may swing to the closed configuration.

A further increase in fluid pressure, or the translation of an appropriate release member from surface, is then utilised to allow the dogs in the dart to retract and release the dart from the shoulder 152, which dart may then pass to an appropriate catcher positioned below the valve assembly 19.

As described above with reference to FIG. 1, the valve assembly 19 has particular utility when used in combination with a bypass valve 18, such as the dart activated bypass valve supplied by the applicant. In particular, the valve assembly 19 may be located in a drilling BHA above the bypass valve 18 for activation prior to opening the valve 18. The dart used to activate the valve assembly 19, may define an outer diameter slightly larger than the darts used to activate the bypass valve 18. However, once the dart dogs have been retracted, the dart will pass through the bypass valve 18 and into a catcher located below the bypass valve 18.

Figure 15:
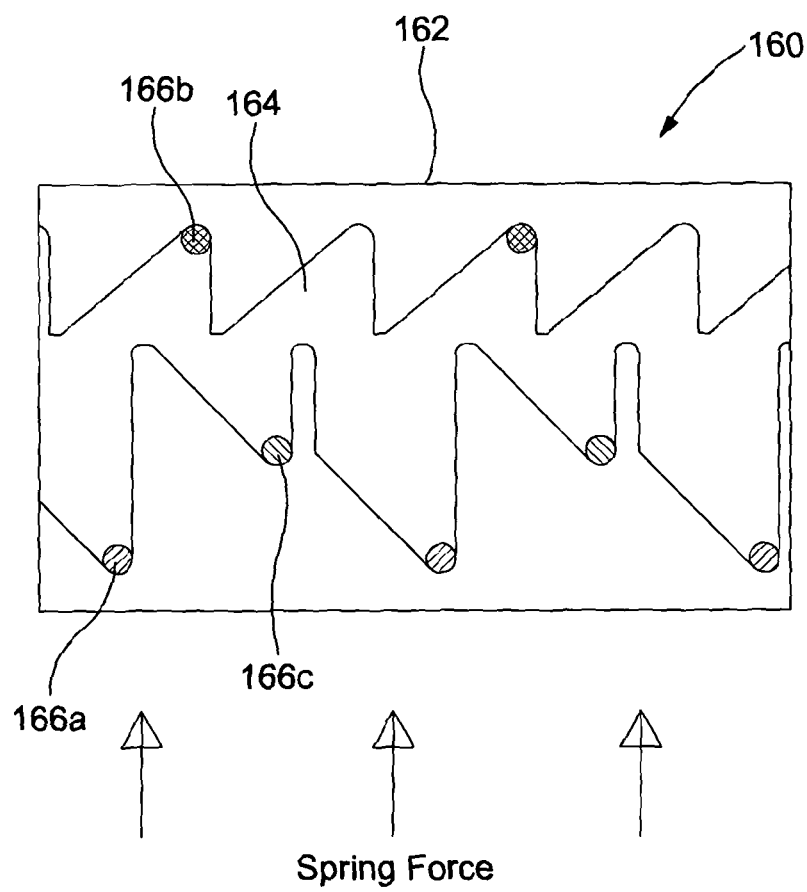
FIG. 15 is a schematic illustration of a cam arrangement of a valve assembly in accordance with an embodiment of the present invention.

Reference is next made to FIG. 15 of the drawings, which illustrates a cam arrangement 160 which, when provided in an alternative valve assembly 19, allows the valve to be cycled between a fully open or dormant configuration and a closed or active configuration. The cam arrangement 160 replaces the sleeve 140 as described above, and includes a cam sleeve 162 having a cam profile 164 formed on its outer surface. Cam follower pins 166 extend inwardly from the surrounding valve body. The sleeve 162 is urged upwards by a spring. The inner surface of the cam sleeve 162 defines a shoulder.

With the valve assembly in a dormant, running or open configuration, the sleeve 162 is urged upwardly such that the upper end of the sleeve 162 retains the flapper in the open position. In this valve configuration the pins are in the position labelled 166a in FIG. 15. If a dart is pumped from surface to land on the cam sleeve shoulder the sleeve 162 may be forced downwards by fluid pressure to release the flapper, and the pins move to position 166b. A further increase in pressure above the dart will then cause the dart dogs to retract and release the dart from the shoulder. The sleeve 162 may then move upwards again relative to the body, but is prevented from returning to the flapper-retaining position by the pins, now in position 166c. The flapper is thus free to close under the influence of a hinge pin spring.

If it desired to open the valve assembly again, a further dart is pumped into the string to push open the flapper and land on the sleeve shoulder. The dart may include a trailing sleeve which holds the flapper open while the dart cycles the sleeve 162 and, after the dart has been pushed out of the sleeve 162, allows the upper end of the sleeve 162 to engage and retain the flapper in the open position.

Figure 16:
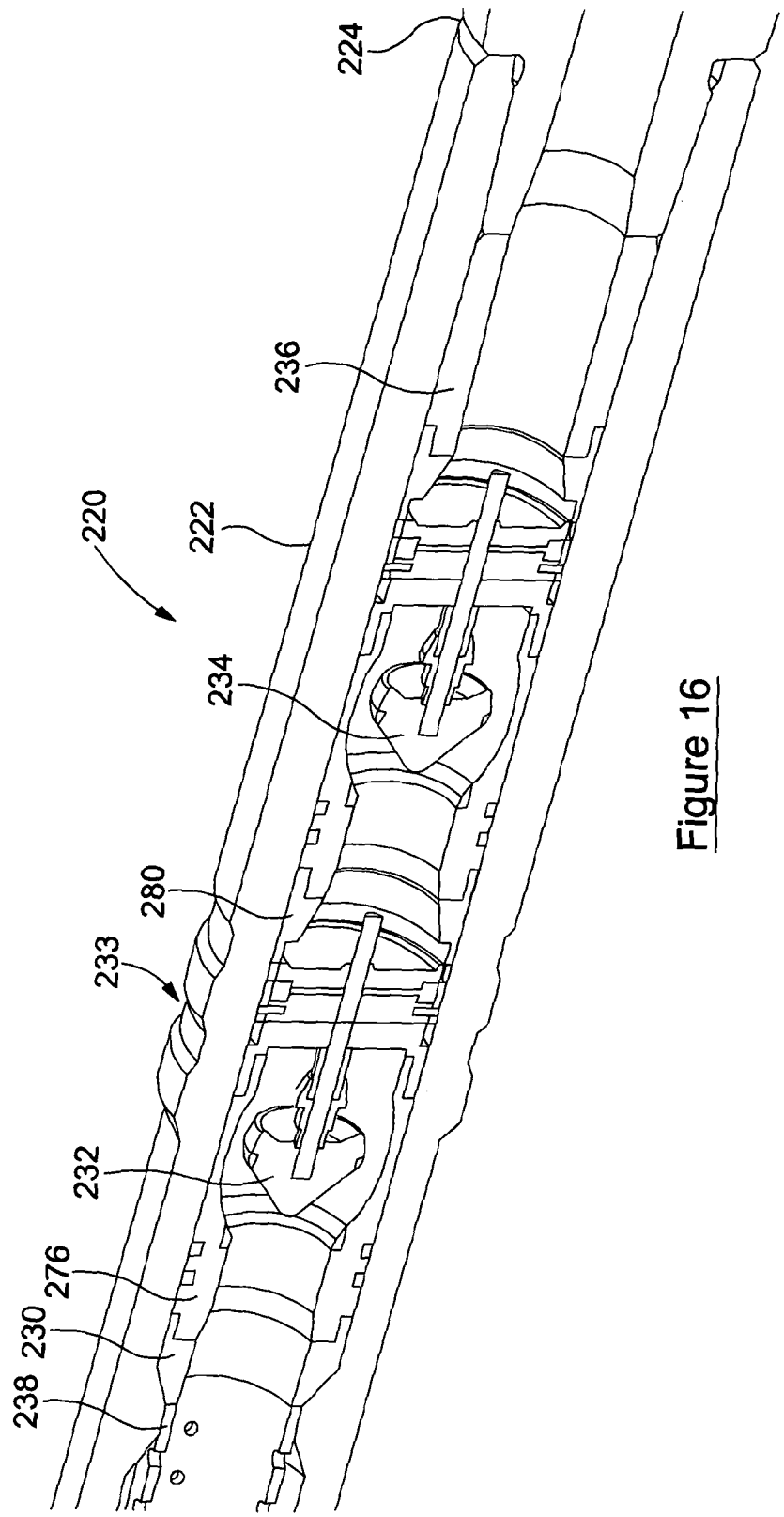
FIG. 16 is a perspective cutaway view of part of a drill string valve arrangement in accordance with a still further embodiment of the present invention.

Reference is now made to FIG. 16 of the drawings, which is a perspective cutaway view of part of a drill string valve arrangement 220 in accordance with a still further embodiment of the present invention. The valve arrangement is similar in construction and operation to the arrangement 20 as described above. However, this particular embodiment is configured to ensure that the arrangement 220 cannot be assembled with the check valve assemblies 232, 234 in the wrong orientation, as will be described below.

In contrast to the planar end faces of the check valve assemblies 32, 34 and their cooperating parts as described above, the assemblies 232, 234 of this embodiment have stepped ends. In particular the respective abutting ends of the reverse thrust support 230, the valve heads 276, the tail sleeves 280, and the spacer sleeve 236 are stepped. Thus, if a valve assembly 232, 234 is inserted into the body 222 in the wrong orientation, the stepped ends will not coincide, the assembled parts will have a greater longitudinal extent, and the parts will not fit within the body 222. This will immediately alert the operator to the problem, which may thus be remedied before the arrangement 220 is incorporated in a string and run into a bore: in the absence of this feature there is a possibility that a wrongly oriented valve assembly would only be identified on activation of the arrangement, when it would become impossible to pump fluid in the normal direction through the string. As well as the enormous expense and inconvenience involved in retrieving and remedying such an error, there would also be significant safety implications.

The skilled person will realise that a similar effect may be obtained by means other than provision of stepped ends, for example by forming the ends with tapers, castellations or the like. Furthermore, the skilled person will realise that the principle of a valve arrangement which may only be incorporated in a string in the correct orientation may be usefully employed in embodiments and aspects other than those described herein, and may indeed form a further independent aspect of the invention.

This embodiment includes some further features to ensure the correct assembly of the arrangement 220. The body bore of the lower end of the body 222 is slightly larger than the bore in the upper end of the body, above the shoulder 238. The check valve assemblies 232, 234 are sized to fit in the larger lower bore and thus cannot be located in the upper bore, ensuring that the assemblies 232, 234 are located in the correct end of the body 222.

In addition, the lower end of the body 222, and thus the end of the body accommodating the check valves 232, 234, is identified externally by the presence of a marker, in the form of two raised bands 233, ensuring that the operator correctly orients the body 222 when the arrangement 220 is incorporated in the string. Furthermore, the box connections are the end of the body 222 may also be different, so that the pin-pin body 224 can only be coupled with the lower box.

Figure 17:
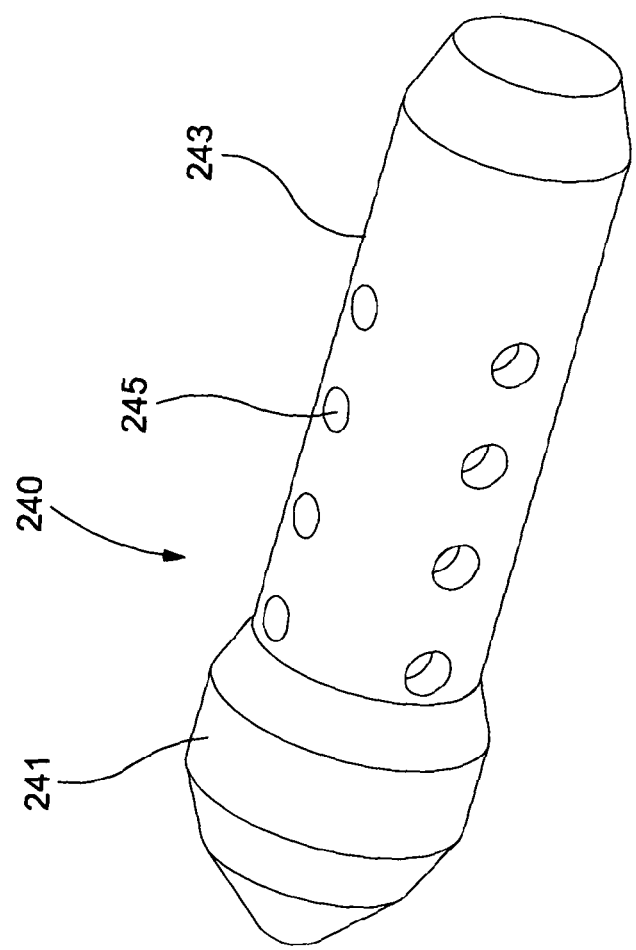
FIG. 17 is a perspective view of an alternative activating device, in the form of a dart.

FIG. 17 is a perspective view of an alternative activating device, in the form of a dart 240. The dart 240 is used in the same manner as the activating ball 40, as described above, as features a solid tapered head 241 and a hollow body 243 including ports 245. If dropped into the string, the dart 240 will pass down through the string land in the sleeve 48 with the body 243 extending into the sleeve 48. Thus, when the dart 240 and the sleeve 48 shear out and land in the fluid bypass section 28, the dart 240 cannot roll off the seat and the tapered head of the dart 240 is shaped to optimize flow diversion through the bypass ports 66 and minimize pressure drop and flow damage. However, the dart 240 will still function even if dropped into the string in the wrong orientation.

Figure 18:
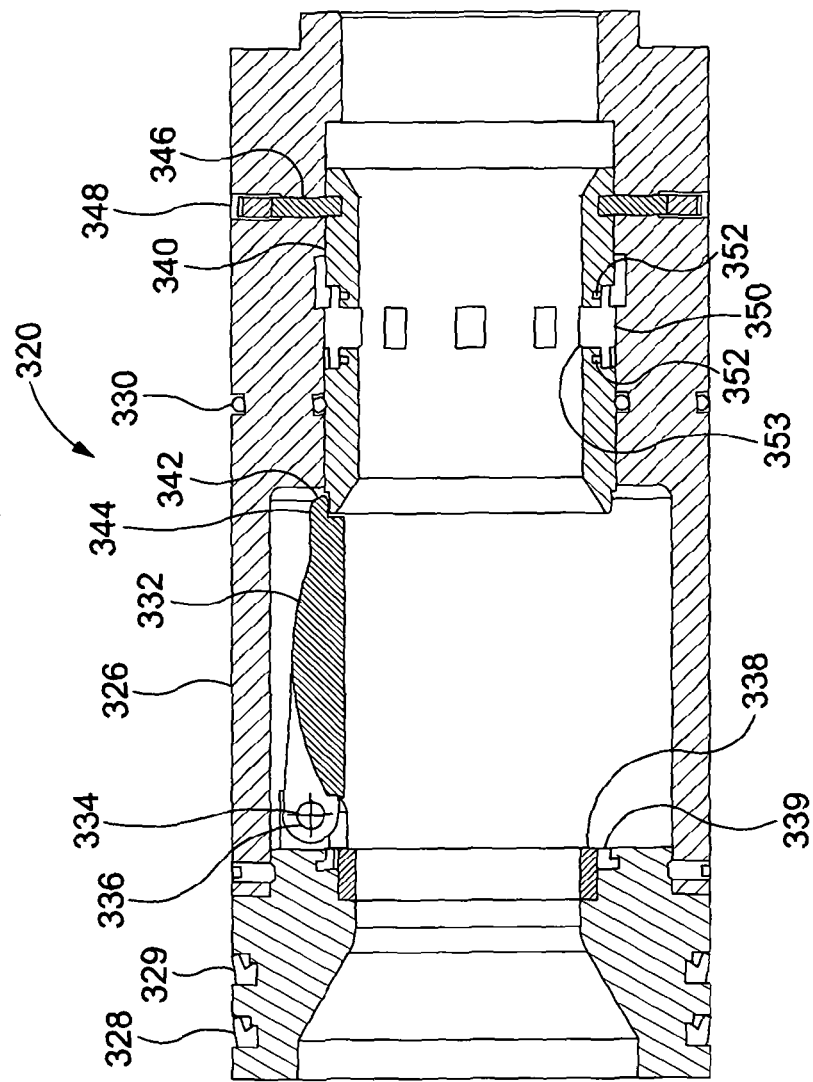
FIG. 18 is a sectional view of a valve assembly in accordance with another embodiment of the present invention.

Reference is now made to FIG. 18 of the drawings, which is a sectional view of an alternative flapper-type check valve arrangement 320. The assembly 320 is similar in some respects to the arrangement 19 described above, although this arrangement 320 is primarily intended to be provided as one of a multiple valve set serving as the primary check valve arrangement in the drill string. The assembly 320 comprises an elongate tubular body 326 carrying a pair of chevron seals 328, 329 to contain upward pressure, and an o-ring seal 330 to contain downward pressure. A flapper 332 is mounted in the body 326 and a spring 334 mounted on a flapper hinge pin 336 acts to urge the flapper 332 towards a closed position ensuring contact with a seat 338 formed by a press-fit insert which retains an L-shaped seal 339.

A portion of the body 326 is cut away below the hinge pin 336 to accommodate the flapper 332 in the open position while maintaining a relatively large through bore. The flapper 332 is retained in the open position by an axially moveable sleeve 340 located in the body 326 below the flapper 332, an upper end of the sleeve defining a recess 342 which accommodates a tab 344 extending from the flapper 332.

With the valve arrangement 322 in the initial, fully open position, the sleeve 340 is fixed in position relative to the body 326 by shear pins 346 retained in the body 326 by grub screws 348.

Figure 19B:
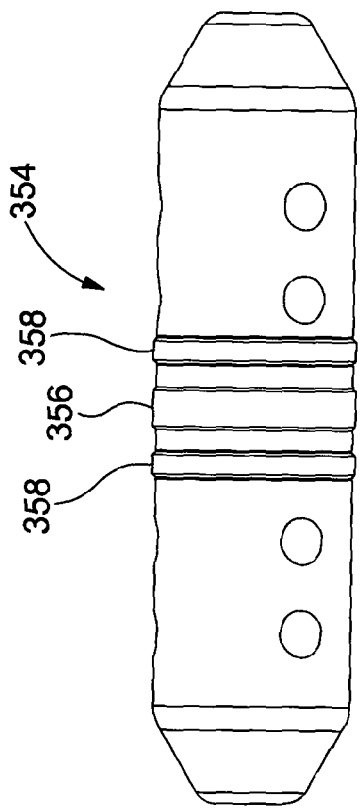
FIGS. 19a and 19b are views of an activating device for cooperating with the valve assembly of FIG. 18.
Figure 19A:
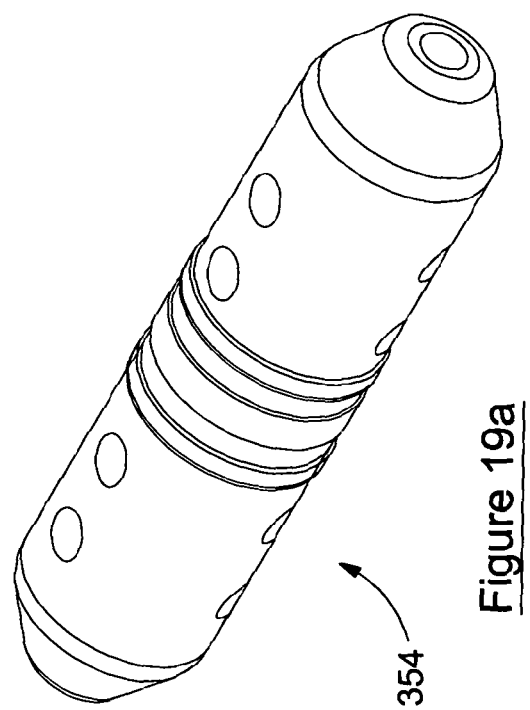

Mounted within the sleeve are eight dogs 350. A pair of springs 352 is provided between the sleeve 340 and each dog 350, the springs 352 tending to urge the dogs radially outwards. However, in the initial position the dogs 350 are radially constrained by the body 326 and collectively defining a small (10-20 thou) internal shoulder or restriction 353 on the inside of the sleeve 340 intended to co-operate with an activating device 354 as illustrated in FIGS. 19a and 19b, and as illustrated landed in the arrangement 320 in FIG. 20a.

The activating device 354 is elongate and generally cylindrical with tapering ends. The maximum diameter of the body of the device 354 is defined by a central shoulder 356 having 45 degree angled ends, to coincide with the 45 degree angled corners of the dogs 350, is shown on FIG. 20b of the drawings. Seals 358 are provided to both sides of the shoulder 356 and define a slightly larger outer diameter than the shoulder. The ends of the device 354 are drilled to form intersecting axial and lateral bores 360 which permit for some circulation of fluid through the device 354 in the event that the device 354 becomes caught on a small internal diameter in the string.

Figure 20B:
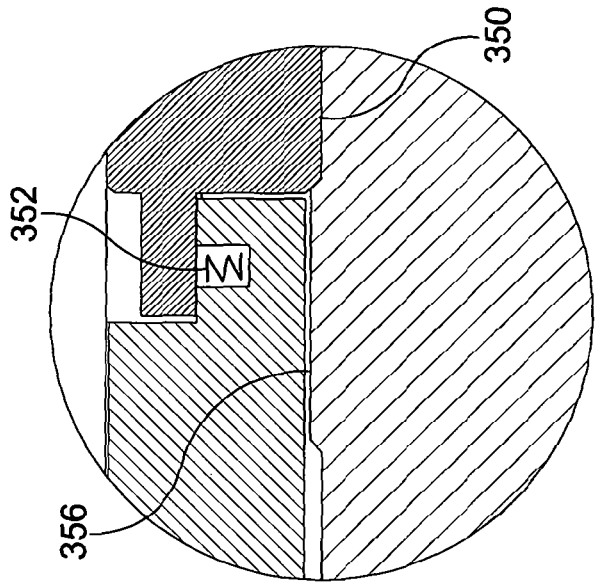
Figure 20A:
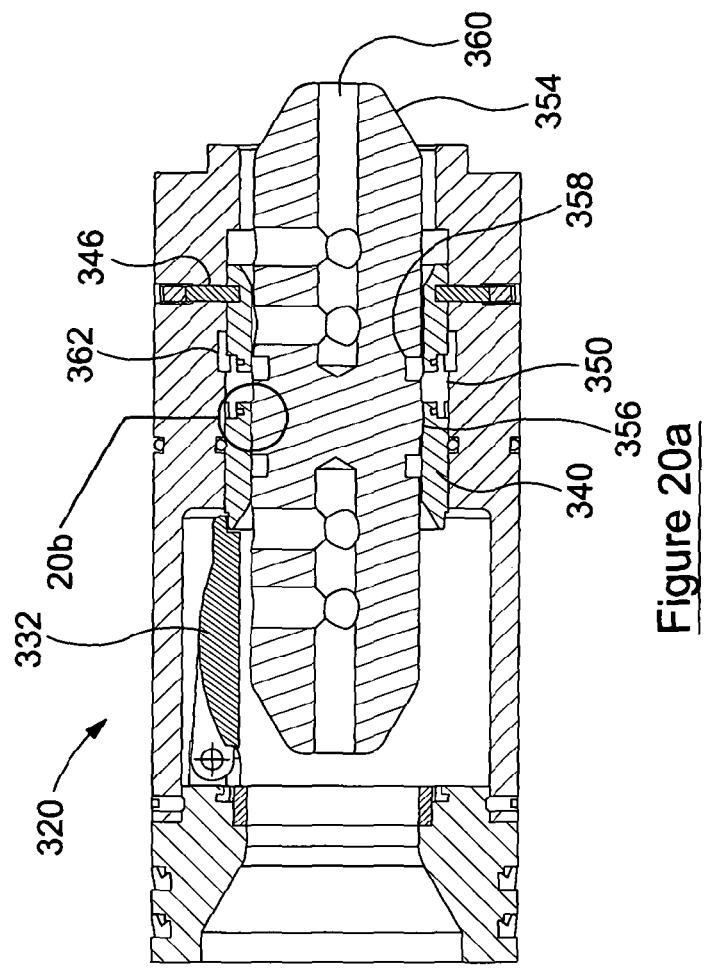
FIG. 20a is a sectional view of the activating device of FIG. 19 engaged with the valve assembly of FIG. 18.

To reconfigure the valve assembly, an operator will drop or pump the activating device 354 from surface, the orientation of the device 354 being irrelevant as the device 354 is symmetrical about a mid-section. The device 354 will travel through the drill string until the shoulder 356 engages the dogs 350 in the sleeve 340, as illustrated in FIGS. 20a and 20b. The seals 358 will engage with the inner surface of the sleeve 340 such that the device 354 substantially occludes the sleeve 340. Thus, an axial fluid pressure force may be applied to the sleeve 340, and if the force is sufficient the shear pins 346 will fail, allowing the sleeve 340 to move downwardly, the downward movement locating the dogs 350 adjacent an annular groove 362, allowing the dogs 350 to move radially outwards, such that the shoulder 356 may move past the dogs 350. The sleeve 340 is retained in the lower position by the spring-biased dogs 350.

On the sleeve 340 moving downwards, the flapper tab 344 is free of the recess 342, and the flapper 332 may swing to the closed configuration.

The activating device 356 may then pass to one or more similar or different arrangements which are activated in a similar manner to the valve arrangement 320. In this particular embodiment it is intended that two identical valve assemblies are provided in tandem, and it will be noted that the upper and lower ends of the body 326 are configured such that the upper end of one body may fit into the lower end of an adjacent body. Thus, the same activating device 356 will be utilised to activate two valve arrangements 320. The device 356 may then pass to an appropriate catcher positioned below the second valve assembly 320.

It will be apparent to those of skill in the art that a similar activating method may be utilised in other applications, and may be used to activate a range of different tools or devices. In particular, a single, relatively simple activating device may be translated though a tubular and used to activate a series of tools or devices. The restriction defined by the dogs (which could equally be provided by a collet or the like) is relatively small, and thus does not unduly restrict the string bore.

Figure 21:
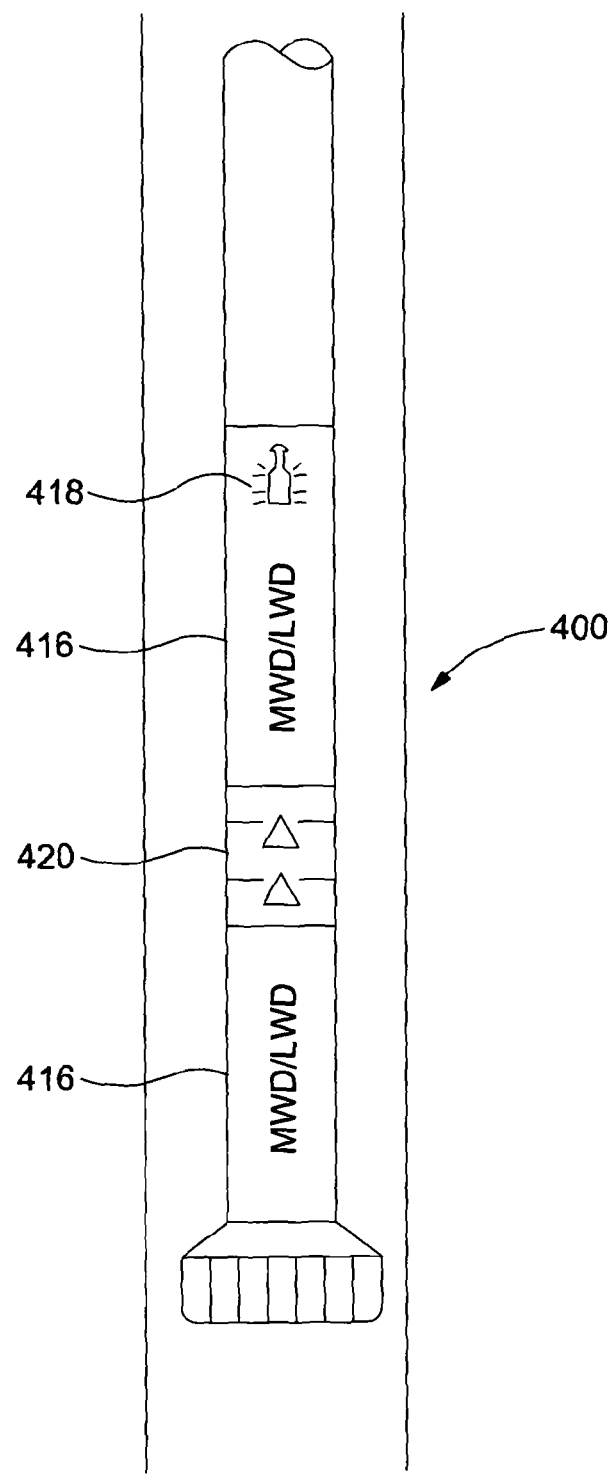
FIGS. 21 and 22 are schematic illustrations of BHAs in accordance with embodiments of the invention.
Figure 22:
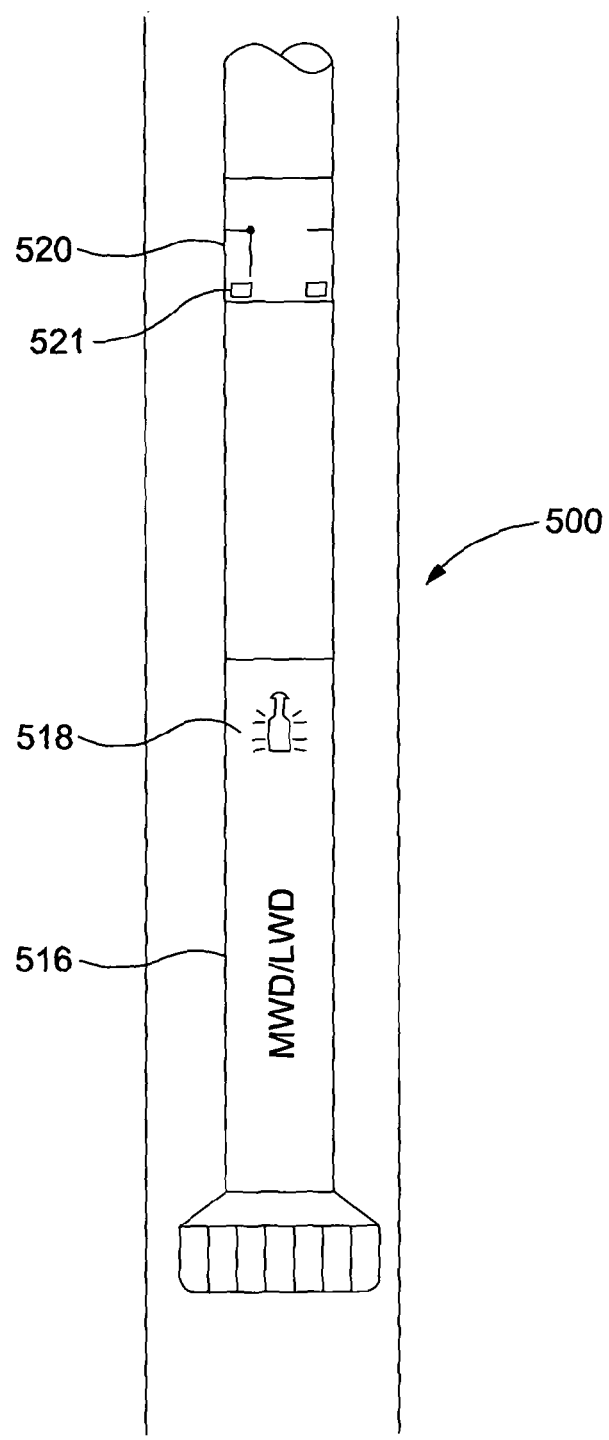

Reference is now made to FIGS. 21 and 22 of the drawings, schematic illustrations of alternative BHAs in accordance with other embodiments of the present invention. In FIG. 21 a BHA 400 includes an MWD/LWD tool 416 and a tandem plunger-type check valve arrangement 420 mounted within the tool 416. The MWD/LWD tool 416 includes a fishable nuclear source 418, above the valve arrangement 420. The valve arrangement 420 is linked to the control and sensor system of the MWD/LWD tool 416, such that signals sent from surface to the tool 416 may be utilised to control the valve arrangement 420, and also signals relating to the condition or setting of the check valve arrangement 420 may be relayed to surface using the MWD/LWD tool 416.

In FIG. 22 a BHA 500 includes an MWD/LWD tool 516 having a nuclear source 518, and a flapper-type check valve 520 located above the source 518. The BHA 500 permits the source to 518 to be fished from the bore in the event of the BHA 500 having to be abandoned in the bore. The valve 520 may be controlled by any suitable arrangement as described herein, for example by pumping RFI chips downhole, which chips are detected by sensors 521 in the valve 520 and allow the valve 520 to assume a different configuration. In the event of abandonment, a fishing tool including a valve opening sleeve may be deployed, the sleeve being withdrawn with the fishing tool and the source 518 to allow the valve 520 to close. Those of skill in the art will recognise that the above described embodiments are merely exemplarily of the present invention and that various modifications may be made thereto without departing from the scope of the invention. The various embodiments and aspects of the invention as described above are primarily intended for use in drilling applications, and thus are of robust construction, capable of accommodating the forces, shocks, temperatures and pressure experienced in a typical drilling operation. However, it will be apparent to those of skill in the art that many of the aspects of the application may have utility in other, non-drilling, applications.

The invention claimed is:

1. A method of tripping a drill string into a bore comprising:
   a) tripping the drill string part way into the bore;
   b) while the drill string is part-way into the bore, pausing tripping the drill string;
   c) with the drill string paused, pumping fluid through the drill string without reconfiguring a check valve located towards a distal end of the drill string from an initial running configuration in which the check valve permits flow both up and down the string;
   d) from part-way into the bore, tripping the drill string further into the bore;
   e) providing a flow restriction and pumping down on the flow restriction to reconfigure the check valve from the running configuration to a normally-closed drilling configuration in which the valve is opened by flow down through the string and, in the absence of flow down through the drill string, remains closed and prevents flow up through the string;
   f) reconfiguring the flow restriction; and
   g) with the reconfigured flow restriction in the string and the check valve in the drilling configuration, pumping fluid through the drill string and the check valve.

2. The method of claim 1, comprising permitting the drill string to self-fill during steps a) and c).

3. The method of claim 1, comprising reconfiguring the check valve from the running configuration to the drilling configuration on the drill string being tripped in to the end of the bore.

4. The method of claim 1, comprising, at step b), pumping fluid through the drill string to test a flow-operated tool provided in the drill string.

5. The method of claim 1, comprising, at step b), pumping fluid through the drill string to perform a shallow hole test on an MWD tool provided in the drill string.

6. The method of claim 1, comprising, after step c), with the drill string further into the bore, pumping fluid through the drill string without reconfiguring the check valve from the initial running configuration.

7. The method of claim 1, comprising the further step of:
   g) pumping fluid through the drill string and the check valve in the drilling configuration to open the check valve, and drilling the bore.

8. The method of claim 1, comprising the further step of providing a bypass valve in the string.

9. The method of claim 8, comprising opening the bypass valve.

10. The method of claim 8, comprising locating the bypass valve towards the distal end of the string and above the check valve.

11. The method of claim 8, comprising locating the bypass valve in the drill string below the check valve.

12. The method of claim 11, comprising providing a further check valve in the drill string below the bypass valve.

13. The method of claim 11, comprising reconfiguring the check valve from the running configuration to the drilling configuration and then opening the bypass valve.

14. The method of claim 1, comprising providing a further flow restriction in the string to limit the rate at which fluid may flow up through the string while the check valve is in the running configuration.

15. The method of claim 14, comprising providing the further flow restriction in the form of a ported flapper check-valve, which opens to permit flow down through the string but closes to restrict flow up through the string, the port in the flapper permitting a degree of flow up through the string sufficient to allow the string to self-fill.

16. The method of claim 1, comprising commencing drilling before reconfiguring the check valve to the drilling configuration.

17. The method of claim 1, wherein reconfiguring the flow restriction includes axially translating a flow restricting member.

18. The method of claim 1, wherein reconfiguring the flow restriction includes providing a fluid bypass around the flow restriction.

19. The method of claim 1, comprising translating a valve activating device down through the drill string to cooperate with the check valve.

20. The method of claim 19, wherein the flow restriction comprises the valve activating device and further comprising creating a fluid pressure differential across the activating device to reconfigure the valve.

21. The method of claim 20, comprising creating a fluid pressure differential across the activating device to reconfigure the activating device.

22. The method of claim 21, wherein reconfiguring the activating device comprises further translating the activating device to a catcher.

23. A drill string assembly for incorporating in a drill string, the drill string assembly comprising:
   a check valve;
   a flow restriction,
   a measurement while drilling (MWD) tool, and
   a drill bit,
   the check valve having: (i) a running configuration in which the check valve permits flow up through the valve and permits fluid to be pumped down through the valve, the MWD tool and the drill bit without reconfiguring the check valve while the drill string is part-way into the bore during a pause in tripping the drill string, and, following provision of a check valve reconfiguring pressure differential across the flow restriction, (ii) a normally-closed drilling configuration in which fluid pumped down through the string opens the valve and bypasses the flow restriction, and in the absence of downwards flow the valve remains closed and prevents flow up through the drill bit, the MWD tool and the valve, and wherein
   the flow restriction is configured to be reconfigurable and to remain in the drill string with the check valve in the normally-closed drilling configuration.

24. The drill string assembly of claim 23, wherein the MWD tool is located between the drill bit and the check valve.

25. The drill string assembly of claim 23, wherein in the running configuration the check valve permits the drill string to self-fill.

26. The drill string assembly of claim 23, wherein the flow restriction comprising a valve activating device translatable through a drill string.

27. The drill string assembly of claim 26, further comprising a catcher and wherein the valve activating device has an activating configuration in which the activating device engages with the check valve and a drilling configuration in which the activating device is located in the catcher.

* * * * *